United States Patent
Chen et al.

(10) Patent No.: US 10,360,871 B2
(45) Date of Patent: Jul. 23, 2019

(54) METHOD FOR SHARING SCREEN WITH EXTERNAL DISPLAY DEVICE BY ELECTRONIC DEVICE AND ELECTRONIC DEVICE

(71) Applicant: SAMSUNG ELECTRONICS CO., LTD., Suwon-si (KR)

(72) Inventors: Xiaoxiao Chen, Beijing (CN); Zhikun Hu, Beijing (CN); Yuanyou Li, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/037,000

(22) PCT Filed: Nov. 14, 2014

(86) PCT No.: PCT/KR2014/010975
§ 371 (c)(1),
(2) Date: May 16, 2016

(87) PCT Pub. No.: WO2015/072787
PCT Pub. Date: May 21, 2015

(65) Prior Publication Data
US 2016/0260408 A1    Sep. 8, 2016

(30) Foreign Application Priority Data

Nov. 14, 2013  (CN) .......................... 2013 1 0573258
Oct. 28, 2014  (CN) .......................... 2014 1 0588298

(51) Int. Cl.
G09G 5/00    (2006.01)
G06F 3/14    (2006.01)
(Continued)

(52) U.S. Cl.
CPC ......... *G09G 5/005* (2013.01); *G06F 3/04845* (2013.01); *G06F 3/04883* (2013.01);
(Continued)

(58) Field of Classification Search
CPC .... G06F 3/0482; G06F 3/04883; G06F 3/044; G06F 3/04845; G06F 3/04817
See application file for complete search history.

(56) References Cited

U.S. PATENT DOCUMENTS 7,783,700 B2   8/2010   Kawazoe et al.
8,332,771 B2   12/2012  Inaba
(Continued)

FOREIGN PATENT DOCUMENTS

CN    101170575 A    4/2008
CN    101876881 A    11/2010
(Continued)

OTHER PUBLICATIONS

Communication dated Feb. 25, 2015 issued by the International Searching Authority in counterpart International Application No. PCT/KR2014/010975 (PCT/ISA/210).
(Continued)

*Primary Examiner* — Nan-Ying Yang
(74) *Attorney, Agent, or Firm* — Sughrue Mion, PLLC

(57) ABSTRACT

An electronic device receives a screen size of at least one external display device adjacent to the electronic device from the at least one external display device, determines a target screen size on the basis of the screen size of the electronic device and the screen size of the at least one external display device, and changes a display configuration parameter of the electronic device such that the screen size of the electronic device corresponds to the target screen size, thereby generating display data for sharing a screen with the at least one external display device.

20 Claims, 32 Drawing Sheets

(51) Int. Cl.
  *G09G 5/14*    (2006.01)
  *G06F 3/0484*  (2013.01)
  *G06F 3/0488*  (2013.01)

(52) U.S. Cl.
  CPC .......... *G06F 3/1446* (2013.01); *G06F 3/1454* (2013.01); *G09G 5/14* (2013.01); *G09G 2340/14* (2013.01); *G09G 2356/00* (2013.01); *G09G 2370/022* (2013.01); *G09G 2370/16* (2013.01)

(56) References Cited

U.S. PATENT DOCUMENTS

| | | |
|---|---|---|
| 2011/0096230 A1 | 4/2011 | Komiya et al. |
| 2011/0202954 A1* | 8/2011 | Oka ................... H04N 5/44543 725/37 |
| 2011/0252317 A1* | 10/2011 | Keranen ............. G06F 3/04883 715/702 |
| 2012/0060109 A1 | 3/2012 | Han et al. |
| 2013/0076764 A1 | 3/2013 | Yada |
| 2013/0093659 A1 | 4/2013 | Nomura et al. |
| 2013/0176255 A1 | 7/2013 | Kim et al. |
| 2013/0194269 A1 | 8/2013 | Matas et al. |
| 2013/0214995 A1* | 8/2013 | Lewin ................... G06F 3/1446 345/1.3 |

FOREIGN PATENT DOCUMENTS

| | | |
|---|---|---|
| CN | 102222493 A | 10/2011 |
| CN | 101674364 A | 11/2011 |
| CN | 102495712 A | 6/2012 |
| CN | 102510405 A | 6/2012 |
| CN | 103366715 A | 10/2013 |
| JP | 2009-294689 A | 12/2009 |
| KR | 10-2012-0028757 A | 3/2012 |

OTHER PUBLICATIONS

Communication dated Apr. 4, 2017, issued by the European Patent Office in counterpart European Application No. 14862354.9.
Communication dated Jan. 18, 2017, issued by the Intellectual Property Office of P.R. China in counterpart Chinese Application No. 201410588298.2.
Communication dated Aug. 1, 2017, issued by the Intellectual Property Office of P.R. China in counterpart Chinese Application No. 201410588298.2.
Communication dated Dec. 6, 2017, issued by the State Intellectual Property Office of the People's Republic of China in counterpart Chinese Patent Application No. 201410588298.2.
Communication dated Jul. 18, 2018, issued by the European Patent Office in counterpart European Application No. 14862354.9.

* cited by examiner

FIG. 16A
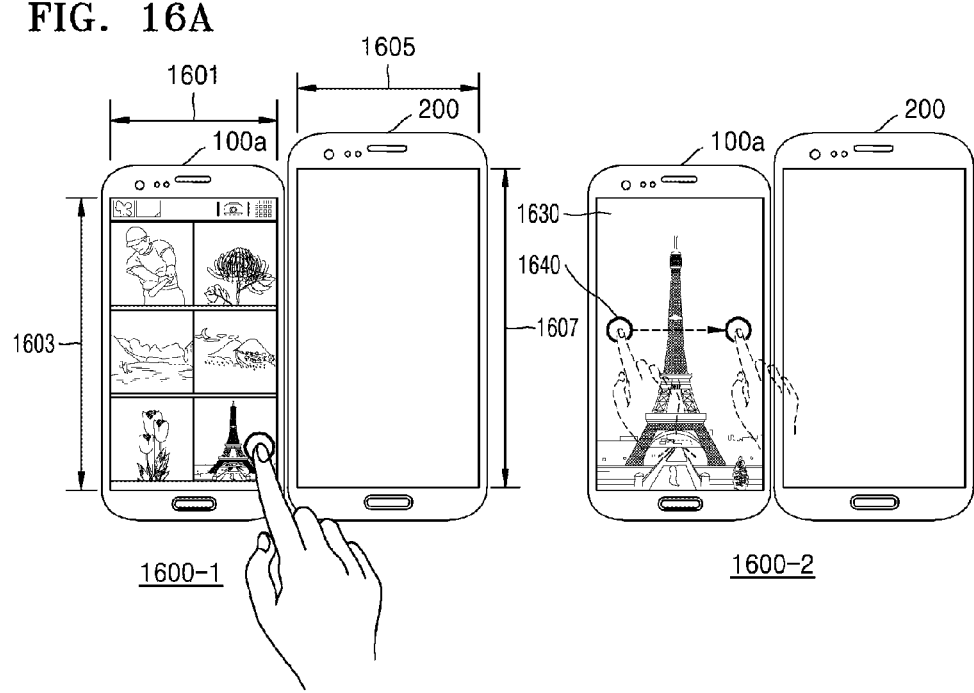
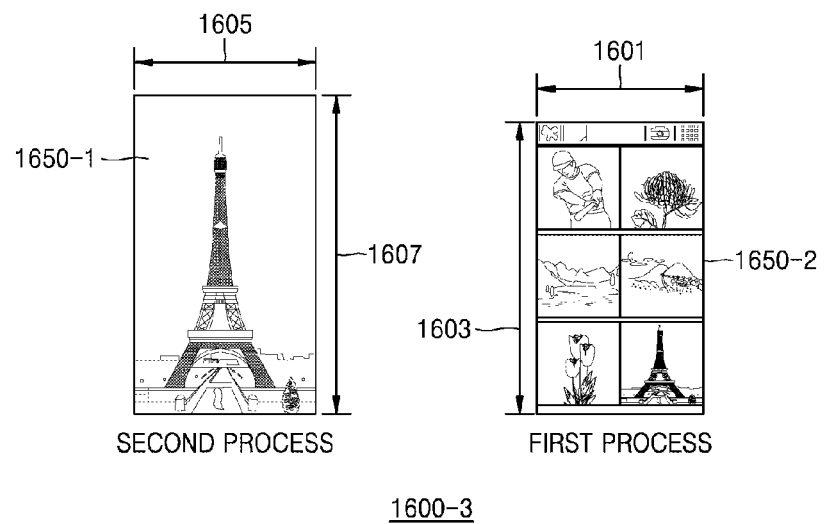

FIG. 19
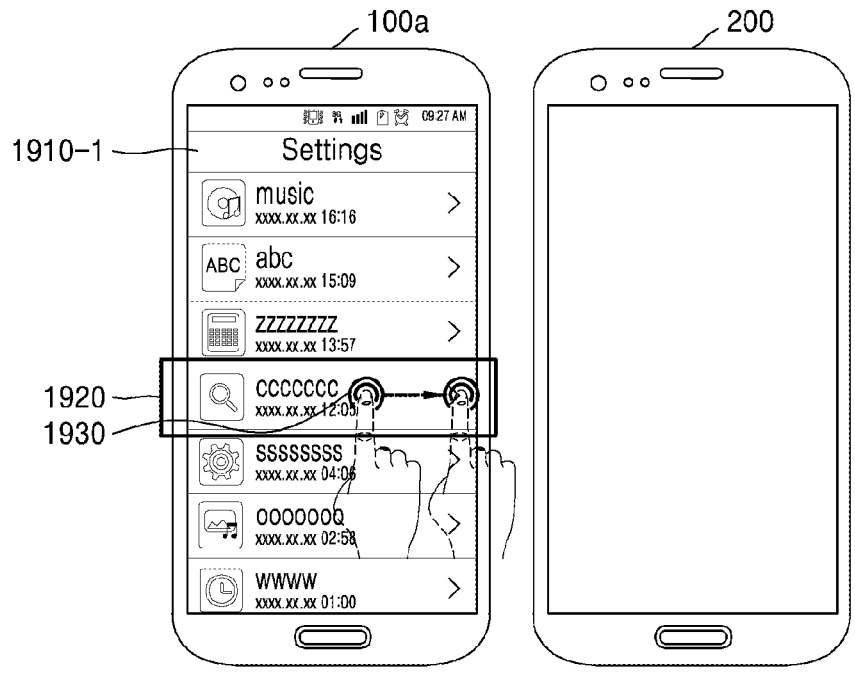
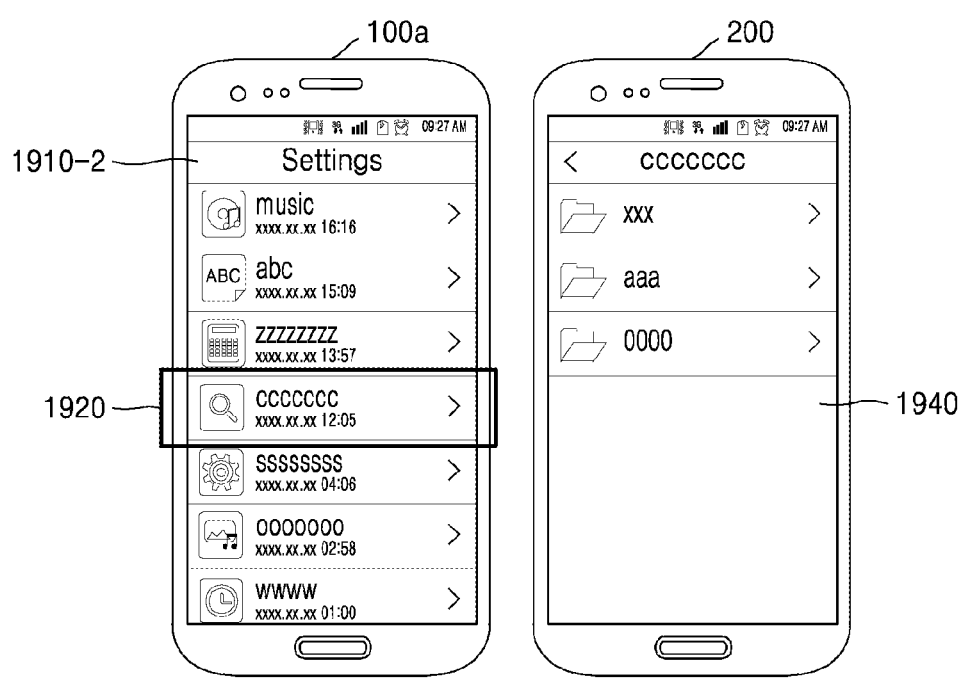

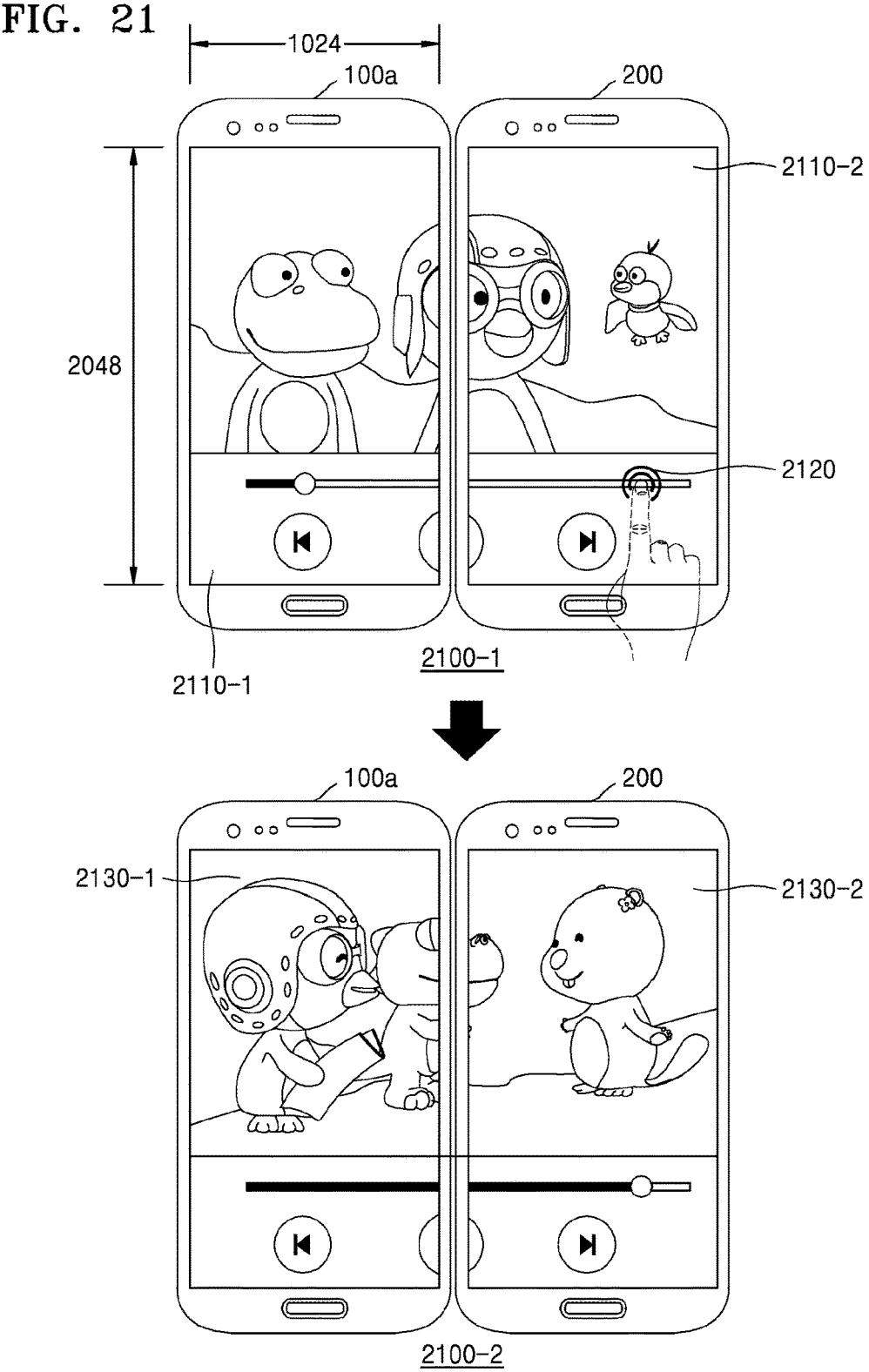

METHOD FOR SHARING SCREEN WITH EXTERNAL DISPLAY DEVICE BY ELECTRONIC DEVICE AND ELECTRONIC DEVICE

This is a National Stage Entry of International Application No. PCT/KR2014/010975 filed Nov. 14, 2014, which claims priority from Chinese Patent Application No. 201310573258.6 filed Nov. 14, 2013 and Chinese Patent Application No. 201410588298.2 filed Oct. 28, 2014, the contents of all of which are incorporated herein by reference in their entirety.

TECHNICAL FIELD

The present invention relates to a method for sharing a screen with an external display device by an electronic device and an electronic device.

BACKGROUND ART

An electronic device, such as a mobile terminal, may be configured to perform various functions. Example of such various functions may include a data and voice communication function, a function of capturing still or moving images through a camera, a voice storing function, a function of reproducing music files through a speaker system, a function of displaying image or video files, and the like. In addition, as the electronic devices are used in so many fields in our daily life, a variety of functions are performed more frequently by sharing screen with other electronic devices. However, various platforms, such as an android platform, a window platform, etc., may be applied to the electronic devices. In addition, differences may exist between the functions performed by each of the platforms. Accordingly, there is a need for a method of sharing the screen with the electronic devices to which different platforms are applied.

DETAILED DESCRIPTION OF THE INVENTION

Technical Problem

As the electronic devices are used in so many fields in our daily life, a variety of functions are performed more frequently by sharing screen with other electronic devices. However, the platforms applied to the electronic devices may be different from each other. Thus, there is a need for the method of sharing the screen with the electronic devices to which different platforms are applied.

Technical Solution

An electronic device according to an embodiment of the present invention includes a communication interface configured to receive a screen size of at least one external display device adjacent to the electronic device from the at least one external display device and a controller configured to determine a target screen size on the basis of the screen size of the electronic device and the screen size of the at least one external display device and change a display configuration parameter of the electronic device such that the screen size of the electronic device corresponds to the target screen size.

Advantageous Effects of the Invention

In the embodiment of the present invention, a device and a method of sharing the screen with at least one external display device by an electronic device to display one content are provided.

In addition, in the embodiment of the present invention, a device and a method of sharing the screen with at least one external display device by an electronic device to display a plurality of contents related to each other are provided.

DESCRIPTION OF THE DRAWINGS

FIG. 16A shows an example of the electronic device 100a generating the display data through the parallel processing in the independent screen mode.

FIG. 19 shows an example of the electronic device 100a generating the display data through the single process or thread in the independent screen mode.

FIG. 20 shows a flowchart of a method of processing an event occurring in the external display device 200 by using the electronic device 100a.

FIG. 21 shows an example of the electronic device 100a generating the display data in accordance with the event occurring in the external display device 200.

FIG. 23 shows a flowchart of a method of sharing a screen through a screen share mode in the electronic device 100a and the external display device 200 having a size different from a size of the electronic device 100a.

BEST MODE

Figure 1:
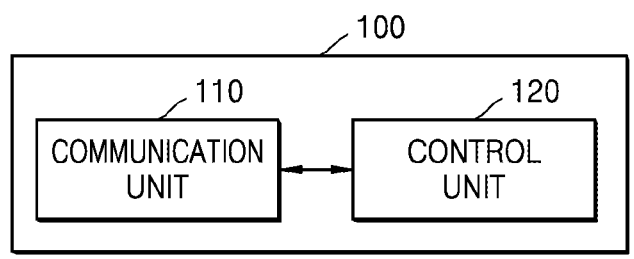
FIG. 1 shows a block diagram of an electronic device 100 according to an embodiment.

An electronic device according to an embodiment of the present invention includes a communication interface configured to receive a screen size of at least one external display device adjacent to the electronic device from the at least one external display device and a controller configured to determine a target screen size on the basis of a screen size of the electronic device and the screen size of the at least one external display device and change a display configuration parameter of the electronic device such that the screen size of the electronic device corresponds to the target screen size.

The controller is further configured to determine the target screen size in accordance with whether the screen size of the electronic device is equal to the screen size of the at least one external display device.

The target screen size is integer times of the screen size of the electronic device in a case where the screen size of the electronic device is equal to the screen size of the at least one external display device.

The controller is further configured to determine a distribution way on the basis of an arrangement of the electronic device and the at least one external display device.

The controller is further configured to generate display data corresponding to the target screen size in accordance with the display configuration parameter and separates the display data in accordance with the distribution way.

The electronic device further includes a display configured to display a part of the display data corresponding to the electronic device based on the separated display data.

The communication interface is further configured to transmit the part of the display data corresponding to the at least one external display device among the separated display data to the at least one external display device.

The target screen size corresponds to the screen size of the at least one external display device in a case where the screen size of the electronic device is not equal to the screen size of the at least one external display device.

The electronic device further includes a user interface configured to receive a user input, and the controller is further configured to generate first display data corresponding to the target screen size through a new process or thread in accordance with the display configuration parameter in response to the user input.

The controller is further configured to change the display configuration parameter to perform parallel processing for the first display data and second display data, to be displayed through the electronic device.

The communication interface is further configured to receive information on an event from the at least one external display device, and the controller is further configured to generate display data corresponding to the target screen size on the basis of the information on the event and the display configuration parameter.

A method of sharing a screen with at least one external display device by an electronic device, includes receiving a screen size of the at least one external display device adjacent to the electronic device from the at least one external display device, determining a target screen size on the basis of a screen size of the electronic device and the screen size of the at least one external display device, and changing a display configuration parameter of the electronic device such that the screen size of the electronic device corresponds to the target screen size.

The determining of the target screen size determines the target screen size in accordance with whether the screen size of the electronic device is equal to the screen size of the at least one external display device.

The target screen size is integer times of the screen size of the electronic device in a case where the screen size of the electronic device is equal to the screen size of the at least one external display device.

The method further includes determining a distribution way on the basis of an arrangement of the electronic device and the at least one external display device.

The method further includes generating display data corresponding to the target screen size in accordance with the display configuration parameter and separating the display data in accordance with the distribution way.

The method further includes displaying a part of the display data corresponding to the electronic device among the separated display data and transmitting the part of the display data corresponding to the at least one external display device among the separated display data to the at least one external display device.

The target screen size corresponds to the screen size of the at least one external display device in a case where the screen size of the electronic device is not equal to the screen size of the at least one external display device.

The method further includes receiving a user input and generating first display data corresponding to the target screen size through a new process or thread in accordance with the display configuration parameter in response to the user input.

The method further includes changing the display configuration parameter to perform parallel processing for the first display data and second display data, to be displayed through the electronic device.

The method further includes receiving information on an event from the at least one external display device and generating display data corresponding to the target screen size on the basis of the information on the event and the display configuration parameter.

MODE OF THE INVENTION

Terms used in the description are briefly explained, and then the present invention will be described in detail.

Terms used in the present invention are selected from generally known and used terms considering their functions within the scope of the present invention, however, the terms may be modified depending on the intention of a person skilled in the art, practices, or the advent of new technology. In addition, some of the terms are arbitrarily selected by applicants. In this case, they should be constructed as having the meaning set forth or used in the detailed description of the present invention rather than the simple lexical meanings. Accordingly, the terms used herein should be understood not simply by the actual terms used but by the meaning lying within and the description disclosed herein.

In the description, when some part "includes" some element, unless specified otherwise, it means that the corresponding part may further include any other element instead of excluding them. Also, terms "part", "module", and the like described in the specification may be used to indicate a unit of processing at least one function or operation and may be implemented by hardware or software or a combination of hardware and software.

In the description, the term "content" used herein may mean digital information displayed through a screen of an electronic device. The content according to an embodiment of the present invention may include a moving image content (e.g., a TV program image, a VOD (Video On Demand), UCC (User-Created Contents), a music video, a YouTube image, etc.), a still image content (e.g., a photograph, a picture, etc.), a text content (e.g., an e-book (poem, novel), a letter, a business file), a music content (e.g., a music, a radio, etc.), a web page, an application execution information, etc., but it should not be limited thereto or thereby.

Hereinafter, embodiments of the present invention will be described in detail with reference to the accompanying drawings as commonly understood by one of ordinary skill in the art to which this invention belongs. However, the present invention may be realized in various different ways, but the present invention should not be limited thereto or thereby. In addition, descriptions of well-known functions and constructions may be omitted for clarity and conciseness. Like numbers refer to like elements throughout.

FIG. 1 shows a block diagram of an electronic device 100 according to an embodiment. Referring to FIG. 1, the electronic device 100 includes a communication interface 110 and a controller 120.

According to the embodiment, the communication interface 110 may communicate with various external devices through various communication methods. For example, the communication interface 110 may communicate with the external display devices through at least one of Wi-Fi, Bluetooth, wireless communication, near field communication (NFC), or the like.

The communication interface 110 may receive screen size information of the external display device from the external display device adjacent to the communication interface 110. The screen size information may include information on a height and a width of the screen of the external display device. The communication interface 110 may apply the screen size information of the external display device to the controller 120. According to embodiments, the screen size information of the external display device may be previously stored in a storing unit (not shown) of the electronic device 100.

The controller 120 may be a hardware configured to include one or more of a central processing unit (CPU), a graphic processing unit (GPU), and an application processor (AP) and may control an overall operation of the electronic device 100. For instance, the CPU of the controller 120 may carry out operations such as executing and controlling an operating system, processing various data, and controlling component(s) of the electronic device 100. In addition, the GPU may calculate attribute values, such as coordinate values, shape, size, color and the like, of the contents displayed in accordance with a layout of the screen. Further, the GPU of the controller 120 may generate display data required to display the contents on the screen on the basis of the calculated attribute values.

The controller 120 may set a display mode on the basis of the screen size information of the external display device and the screen size information of the electronic device 100. For example, the controller 120 may set a screen share mode in a case that the screen size information of the external display device is substantially the same as the screen size information of the electronic device 100. The screen share mode may be a mode in which the electronic device 100 and the external display device share the screen to display one content. It will be understood that the screen share mode may be set even though the screen size information of the external display device is not the same as the screen size information of the electronic device 100 by one of ordinary skill in the art to which this invention belongs.

In addition, the controller 120 may set an independent screen mode in a case that the screen size information of the external display device is different from the screen size information of the electronic device 100. The independent screen mode may be a mode in which the electronic device 100 and the external display device display a plurality of contents related to each other through the screen of each device. It will be understood that the independent screen mode may be set even though the screen size information of the external display device is substantially the same as the screen size information of the electronic device 100 by one of ordinary skill in the art to which this invention belongs. For instance, the controller 120 may set the display mode on the basis of a user set. According to an embodiment, the controller 120 may provide a user interface used to receive a user input and set the display mode in response to the user input when the controller 120 receives the user input through the user interface.

The controller 120 may determine a target screen size in accordance with the set mode. The target screen size may mean a size of the screen through which the content is displayed. For example, in the screen share mode, the target screen size may correspond to a screen size shared by the electronic device 100 and the external display device. Accordingly, the target screen size may be expressed in integer (N) times of the screen size. In the independent screen mode, the target screen size may be the screen size of the electronic device 100 or the external display device through which the content is displayed.

The controller 120 may change a display configuration parameter of the electronic device 100 such that the screen size of the electronic device 100 corresponds to the target screen size. Here, the display configuration parameter may be a control parameter used to control at least one hardware related to the display or a parameter with respect to a hardware attribute value. For example, the controller 120 may change the display configuration parameter such that an LCD size corresponds to the target screen size. In addition, the controller 120 may change the display configuration parameter to change an attribute value of the graphic processing unit (GPU) such that the screen size of the electronic device 100 corresponds to the target screen size. Since the display configuration parameter is changed, the controller 120 may perform an operation related to the display in accordance with the target screen size regardless of a real screen size of the electronic device 100. In addition, the controller 120 may determine a distribution way on the basis of an arrangement of the electronic device and the external display device. The distribution way may be a method of distributing the display data generated by the electronic device 100 to external display devices adjacent to the electronic device 100 and may be expressed in the form of a single line, a two-by-two square, etc., in accordance with the arrangement of the electronic device 100 and the external display device. The controller 120 may determine the height and width of the target screen size on the basis of the distribution way.

The controller 120 may generate the display data corresponding to the target screen size in accordance with the display configuration parameter. The display data may include pixel information to display the content on the screen. In the screen share mode, the controller 120 may divide the generated display data in accordance with the distribution way. According to an embodiment, the controller 120 may change the display configuration parameter of the electronic device 100 to render each of the divided display data. For instance, the controller 120 may change the display configuration parameter to allow the GPU to render the display data after zooming all the display data into the divided areas. As another way, the controller 120 may change the display configuration parameter of the electronic device 100 to allow the divided display data to be respectively rendered. Then, the electronic device 100 may display the rendered result. In addition, the electronic device 100 may compress the rendered result and transmit the compressed result to the external display device through the communication interface 110.

In the independent screen mode, the controller 120 may generate the display data through a new process or thread. In addition, the controller 120 may render the generated display data and transmit the rendered result to the external display device. The configuration of the electronic device 100 performing the display function using the external display device in the independent screen mode will be described later with reference to FIG. 12.

As described above, the electronic device 100 according to the present embodiment may generate the display data including the pixel information corresponding to the target screen size and share the generated display data with the external display device. Thus, the electronic device 100 may share the screen with the external display device without considering the platform (e.g., an android platform, a window platform, etc.) of the external display device.

Figure 2:
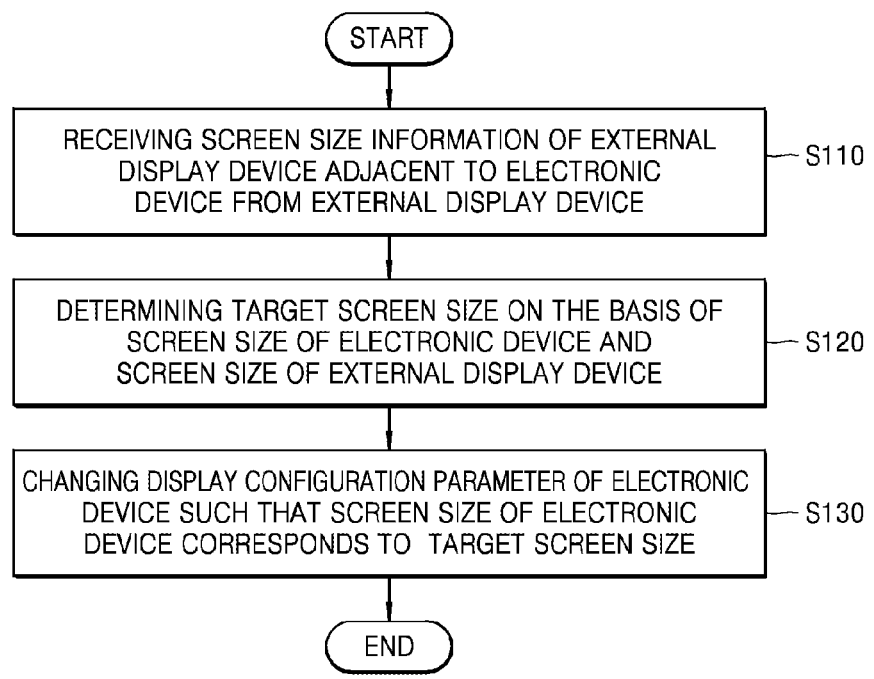
FIG. 2 shows a flowchart of a method of sharing a screen with an external display device by the electronic device 100 adjacent to the external display device according to an embodiment.

FIG. 2 shows a flowchart of a method of sharing a screen with the external display device by the electronic device 100 adjacent to the external display device according to an embodiment.

Referring to FIG. 2, the electronic device 100 may receive the screen size information of the external display device adjacent to the electronic device 100 from the external display device (S110). The screen size information may include information on the height and width of the external display device.

The electronic device 100 may determine the target screen size on the basis of the screen size of the electronic device 100 and the screen size of the external display device (S120). The electronic device 100 may check whether the height and width of the screen of the electronic device 100 are substantially the same as the height and width of the external display device. The electronic device 100 may set the display mode in accordance with the check result. The display mode may include the screen share mode and the independent screen mode. The screen share mode may be the mode in which the electronic device 100 and the external display device share the screen to display the one content. For instance, the one content displayed by the electronic device and the external display device through the shared screen may include image data, moving image data, application data, and various web documents, such as HTML files. The independent screen mode may be the mode in which the electronic device 100 and the external display device display the contents related to each other through the screen of each device. For instance, in the case that the screen size of the electronic device 100 is substantially the same as the screen size of the external display device, the electronic device 100 may set the screen share mode. In addition, in the case that the screen size of the electronic device 100 is different from the screen size of the external display device, the electronic device 100 may set independent screen mode. As another way, the electronic device 100 may set the screen share mode or the independent screen mode on the basis of the input provided from the user.

The electronic device 100 may change the method of sharing the screen with the external display device in accordance with the display mode. In addition, the electronic device 100 may change the target screen size in accordance with the display mode. The target screen size may mean the size of the screen through which the content is displayed. For instance, the electronic device 100 may determine the target screen size to be integer (N) times of the screen size of the electronic device 100 in the screen share mode. Different from the above, in the independent screen mode, the electronic device 100 may determine the target screen size to be equal to the screen size of the electronic device 100 or the screen size of the external display device.

The electronic device 100 may change the display configuration parameter of the electronic device 100 such that the screen size of the electronic device 100 corresponds to the target screen size (S130). The display configuration parameter may be the control parameter used to control at least one hardware related to the display or the parameter with respect to the hardware attribute value. For example, the electronic device 100 may change the display configuration parameter with respect to the LCD or GPU, but it should not be limited thereto or thereby. That is, the electronic device 100 may change the display configuration parameter of the hardware related to the display. The electronic device 100 may generate the display data corresponding to the target screen size in accordance with the display configuration parameter. The display data may include the pixel information to display the content on the screen. According to an embodiment, in the screen share mode, the electronic device 100 may transmit a portion of the display data used to display the one content on the screen to the external display device, and thus the electronic device 100 may display the one content with the external display device. According to another embodiment, in the independent share mode, the electronic device 100 may transmit the generated display data to the external display device, and thus the contents related to each other may be displayed through each of the electronic device 100 and the external display device.

Figure 3:
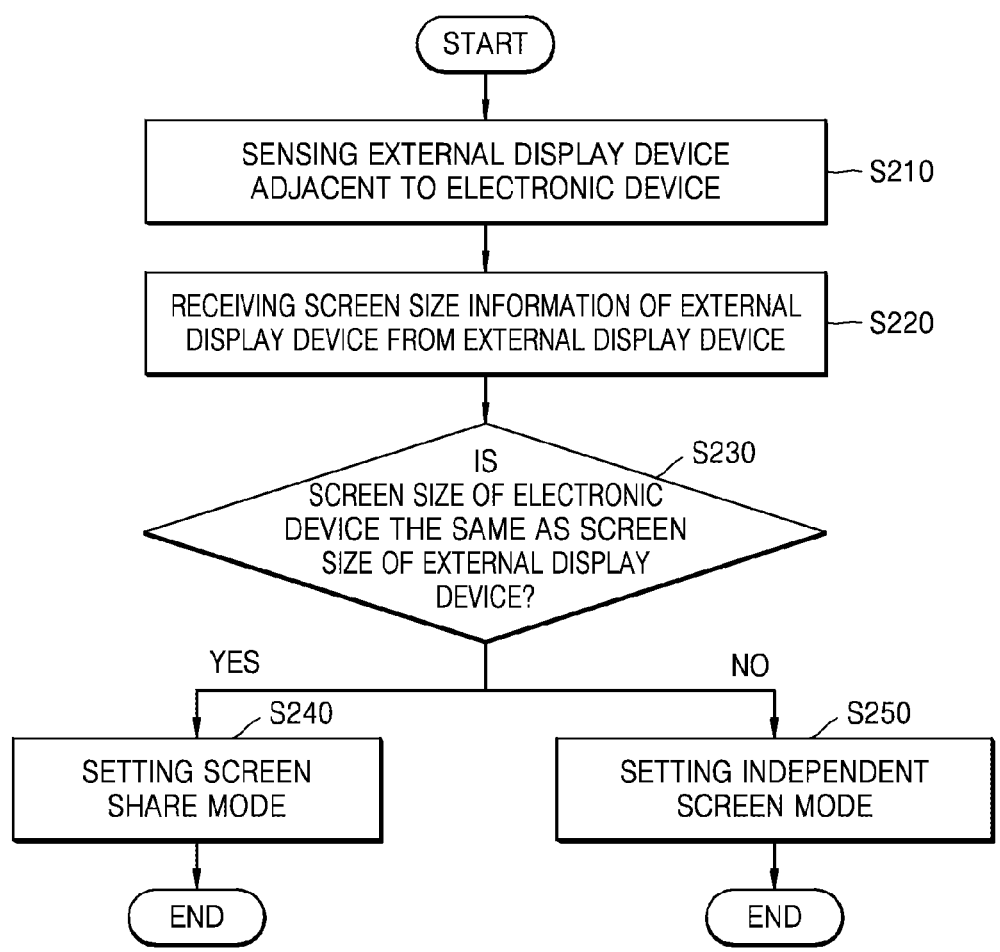
FIG. 3 shows a flowchart of a method of sensing the external display device adjacent to the electronic device 100 and setting a display mode by the electronic device 100.

FIG. 3 shows a flowchart of a method of sensing the external display device adjacent to the electronic device 100 and setting the display mode by the electronic device 100.

Referring to FIG. 3, the electronic device 100 may sense the adjacent external display device (S210). The electronic device 100 may include various sensors to sense the external display device adjacent to the electronic device 100. For instance, the electronic device 100 may include at least one of a proximity sensor, an infrared sensor, and an electromagnetic sensor. According to an embodiment, the electronic device 100 may check whether the external display device is adjacent to the electronic device 100 through the proximity sensor disposed on a side surface portion of a main body of the electronic device 100. As another way, the electronic device 100 may check whether the external display device is adjacent to the electronic device 100 on the basis of position information provided from the external display device and position information of the electronic device 100.

In addition, the electronic device 100 may sense relative positions of the external display devices adjacent to the electronic device 100. For example, the electronic device 100 may sense whether the adjacent external display device is positioned to the right or left of (or, above or under) the electronic display device 100 as viewed relative to the electronic display device 100. Accordingly, the electronic device 100 may have the arrangement of the electronic device 100 and the external display device.

The electronic device 100 may receive the screen size information of the external display device from the external display device (S220). The screen size information may include information on the height and width of the external display device.

The electronic device 100 may check whether the screen size of the external display device is the same as the screen size of the electronic device 100 (S230). The electronic device 100 may set the display mode in accordance with the check result. In the case that the screen size of the electronic device 100 is the same as the size of the external display device, the electronic device 100 may set the screen share mode (S240). Here, the expression that the screen size of the electronic device 100 is the same as the size of the external display device may mean not only a case that the height and width of the screen of each device are all the same, but also a case that a difference in height between screens of the devices and a difference in width between screens of the devices are in a predetermined tolerance range. In the case that the screen size of the electronic device 100 is different from the screen size of the external display device, the electronic device 100 may set the independent screen mode (S250).

Meanwhile, in the above-mentioned description, the electronic device 100 sets the display mode on the basis of the screen size information of the external display device from the external display device, but it should not be limited thereto or thereby. For example, the electronic device 100 may receive the user input selecting the display mode. In this case, the electronic device 100 may be operated on the basis of the display mode set by the user input when the external display device is adjacent to the electronic device 100.

Figure 4:
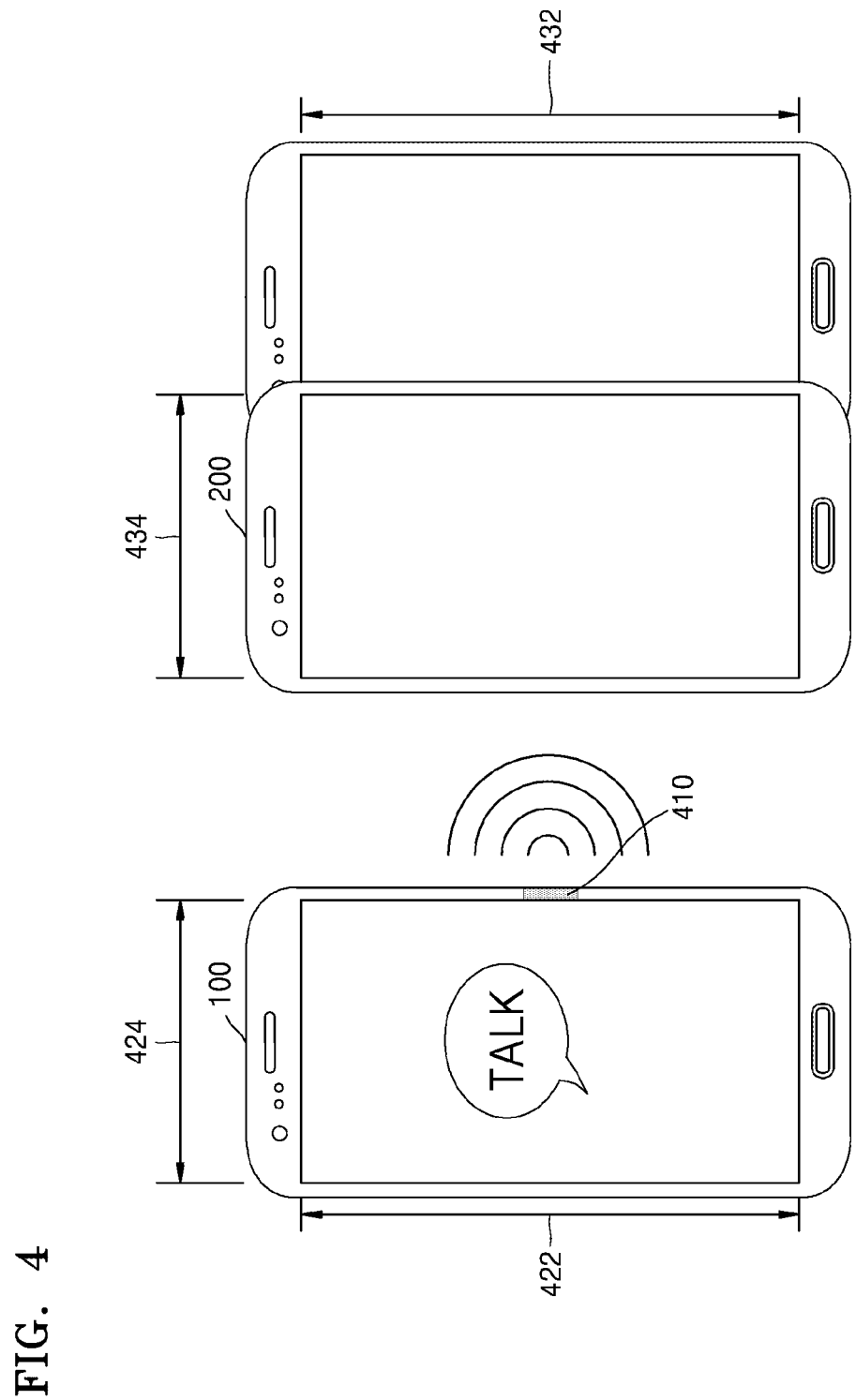
FIGS. 4 and 5 show an example of the electronic device 100 sensing the external display device 200.
Figure 5:
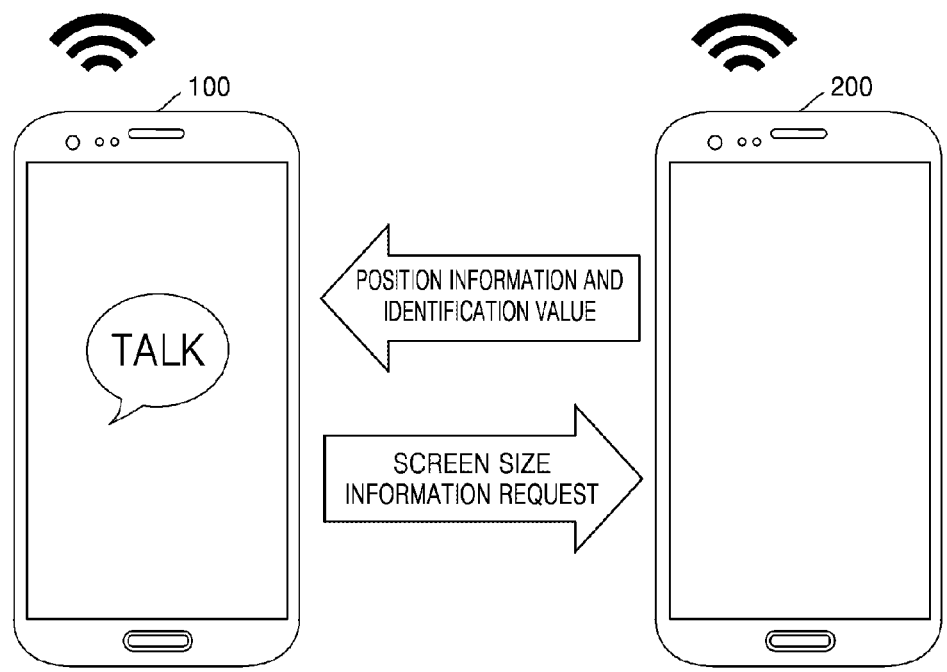

FIGS. 4 and 5 show an example of the electronic device 100 sensing the external display device 200.

According to an embodiment, the electronic device 100 may sense the external display device 200 adjacent to the electronic device 100 through the proximity sensor 410 disposed in a bezel of the side surface portion of the main body of the electronic device as shown in FIG. 4. The proximity sensor 410 may be disposed on the bezel of at least one side surface portion of the electronic device 100 or inside or outside a bezel of a front surface portion of the electronic device 100. The proximity sensor 410 may be a sensor that senses an object adjacent to a predetermined sensing surface or presence or absence of an object in the vicinity of the proximity sensor 410 using a power of electromagnetic field or an infrared ray without a mechanical contact.

The electronic device 100 may receive the screen size information of the external display device from the external display device 200 adjacent to the electronic device 100. The screen size information may include information about the height 432 and the width 434 of the screen of the external display device. The electronic device 100 may compare the height 422 and the width 424 of the screen of the electronic device 100 with the height 432 and the width 424 of the screen of the external display device to set the display mode.

As shown in FIG. 5, the electronic device 100 may receive the position information of the external display device 200 from the external display device 200. The electronic device 100 may sense the adjacent external display device 200 on the basis of the position information. For instance, the electronic device 100 may receive an identification value of the external display device 200 together with the position information of the external display device 200 through a short-range wireless communication (e.g., Bluetooth). The electronic device 100 may check whether the external display device 200 and the electronic device 100 are located in a critical range on the basis of the received position information. In a case that the external display device 200 is located within the critical range, the electronic device 100 may request the screen size information of the external display device 200 in accordance with the received identification value.

Figure 6:
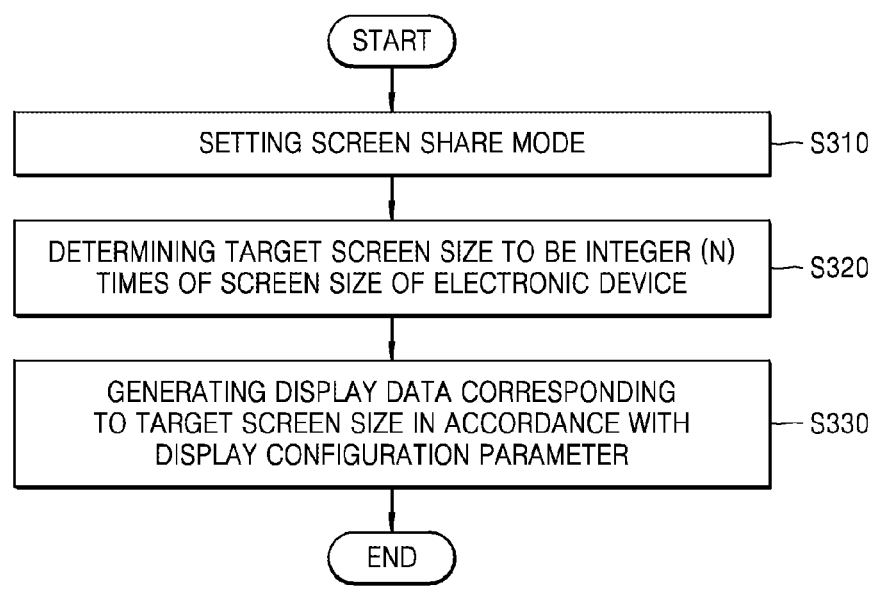
FIG. 6 shows a flowchart of a method of generating display data in a screen share mode by the electronic device 100.

FIG. 6 shows a flowchart of a method of generating display data in a screen share mode by an electronic device 100.

Referring to FIG. 6, the electronic device 100 may set the screen share mode (S310). In this case, the electronic device 100 may determine the target screen size to be integer (N) times of the screen size of the electronic device 100 (S320). Here, the target screen size may mean the size of the screen on which the content is displayed. In addition, the integer (N) may mean a sum of the number of the electronic devices 100 and the number of the external display devices adjacent to the electronic device 100. For example, in a case that the electronic device 100 senses one external display device adjacent to the electronic device 100 (N is 2), the electronic device 100 may increase the target screen size by about two times. In a case that the electronic device 100 senses three external display devices adjacent to the electronic device 100 (N is 4), the electronic device 100 may increase the target screen size by about four times.

In addition, the electronic device 100 may determine the distribution way. The distribution way may be a method of distributing the display data generated by the electronic device 100 to the external display devices adjacent to the electronic device 100 and may be expressed as a single line, a two-by-two square, etc., in accordance with the arrangement of the electronic device 100 and the external display devices. The electronic device 100 may increase the height and the width of the screen of the electronic device 100 by about the integer (N) times on the basis of the distribution way. For instance, in a case that the distribution way is the single line, the electronic device 100 may allow the height (or the width) of the target screen size to be integer (N) times greater than the height (or the width) of the screen of the electronic device. In addition, in a case that the distribution way is the two-by-two square, the electronic device 100 may allow the height and the width of the target screen size to be two times greater than the height and the width of the screen of the electronic device.

The electronic device 100 may generate the display data corresponding to the target screen size in accordance with the display configuration parameter (S330). The display data may include the pixel information to display the content on the screen. For example, the display data may include the pixel information used to display the content running in the electronic device 100 on the screen having the target screen size.

Figure 7A:
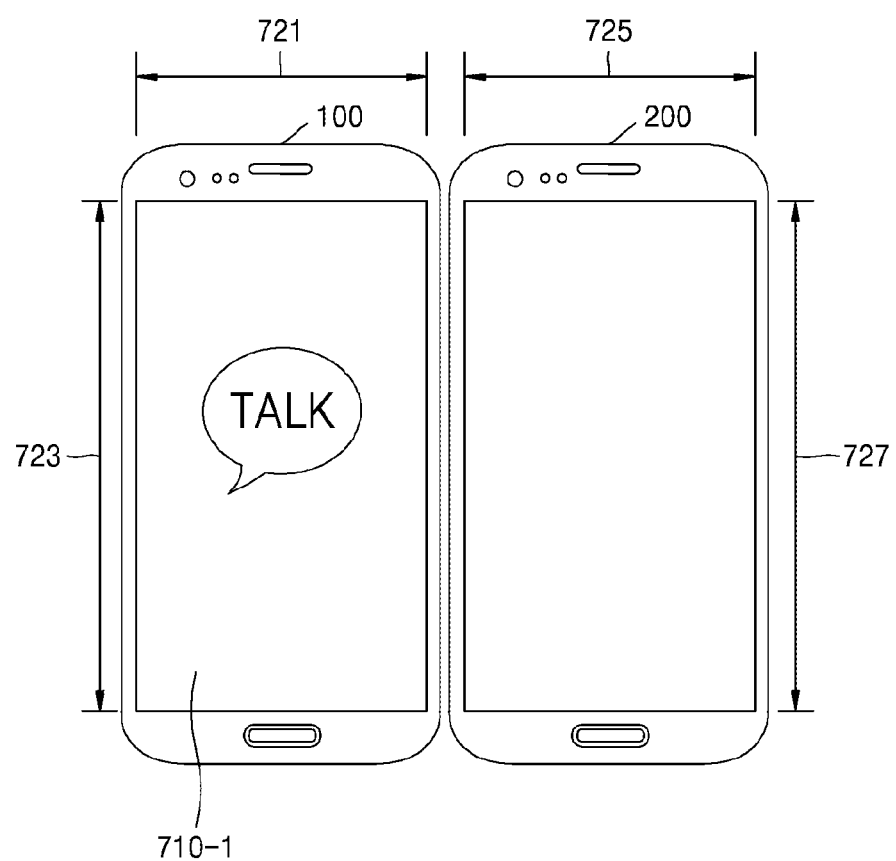
FIGS. 7A and 7B show an example of a method of determining a target screen size by the electronic device 100 in the screen share mode.
Figure 7B:
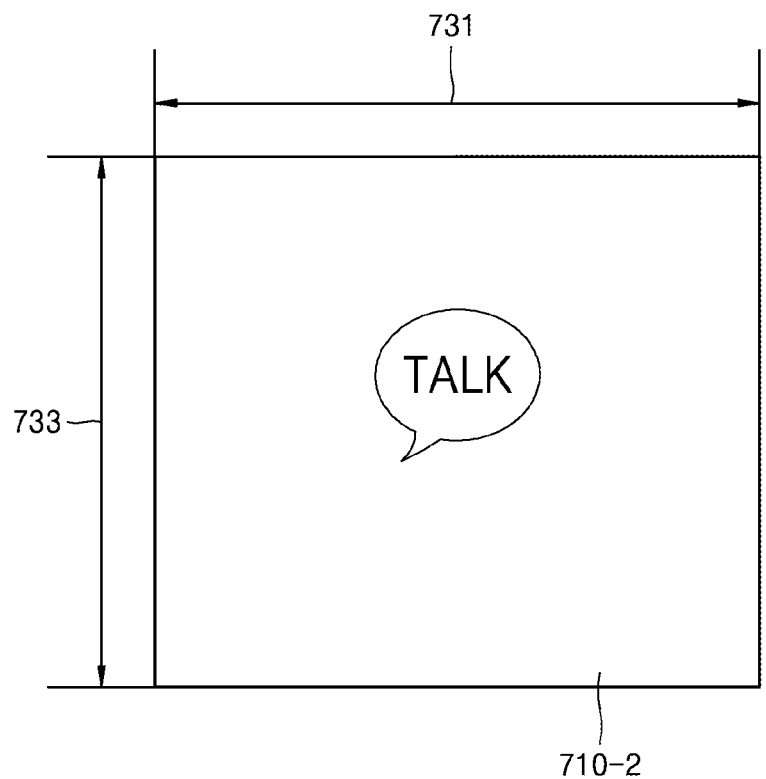

FIGS. 7A and 7B show an example of a method of determining a target screen size by the electronic device 100 in the screen share mode.

Referring to FIG. 7A, the electronic device 100 may sense the external display device 200 disposed adjacent to the electronic device 100. The electronic device 100 may set the screen share mode in a case that a screen size 725 and 727 of the adjacent external display device 200 is substantially the same as a screen size 721 and 723 of the electronic device 100. The electronic device 100 may determine the target screen size to be two times greater than the screen size 721 and 723 of the electronic device 100 in the screen share mode. In addition, the electronic device 100 may determine the distribution way to the single-line distribution way in accordance with the arrangement of the external display device 200. The electronic device 100 may determine the width 731 of the target screen size to be two times greater than the screen size 721 of the electronic device 100 in accordance with the signal-line distribution way. Thus, as shown in FIG. 7B, the target screen size may have substantially the same height 734 as the screen height 724 of the electronic device 100 and may have the width 732 obtained by increasing the screen width 722 of the electronic device 100 by about two times.

Meanwhile, the electronic device 100 may generate display data 710-2 to allow a content 710-1 displayed on the screen of the electronic device 100 to be displayed in the screen having the target screen size 731 and 733 in the screen share mode. To this end, the electronic device 100 may change the display configuration parameter such that the LCD size of the electronic device 100 corresponds to the target screen size 732 and 734. As another way, the electronic device 100 may change the display configuration parameter such that the GPU calculates the screen size of the electronic device 100 as the target screen size 732 and 734.

Figure 8A:
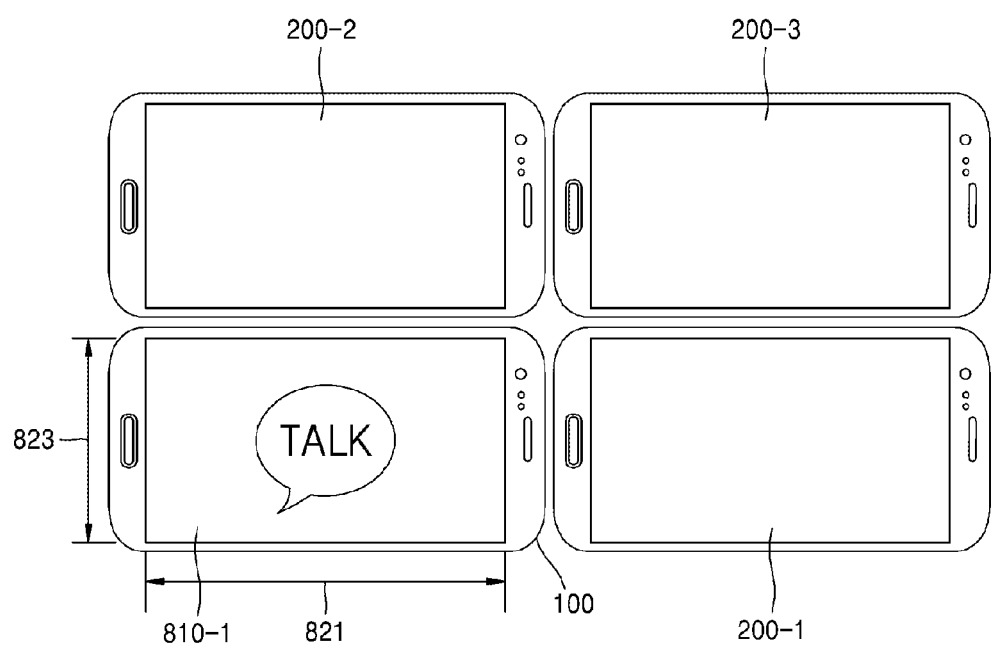
FIGS. 8A and 8B show an example of a method of determining a target screen size by the electronic device 100 in the screen share mode.
Figure 8B:
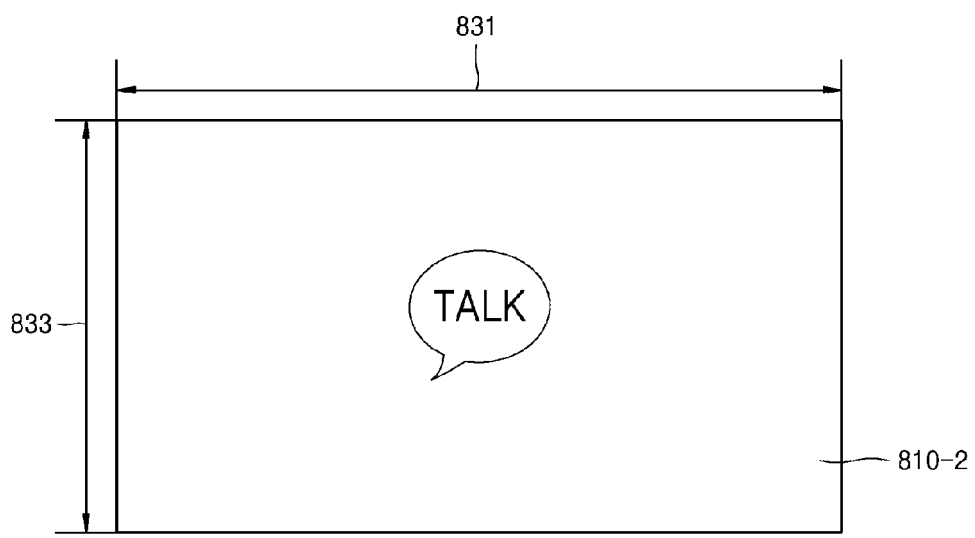

FIGS. 8A and 8B show an example of a method of determining a target screen size by the electronic device 100 in the screen share mode.

Referring to FIG. 8A, the electronic device 100 may sense external display devices 200-1 to 200-3 disposed adjacent to the electronic device 100. The electronic device 100 may set the screen share mode in a case that a screen size of the adjacent external display devices 200-1 to 200-3 is substantially the same as a screen size of the electronic device 100. In this case, the electronic device 100 may determine the target screen size to be four times greater than the screen size 821 and 823 of the electronic device 100. In addition, the electronic device 100 may determine the distribution way to the two-by-two square distribution way in accordance with the arrangement of the external display devices 200-1 to 200-3. Thus, as shown in FIG. 8B, the target screen size may have the width 832 and the height 834 obtained by respectively increasing the screen width 821 and the height 823 of the electronic device 100 by about two times.

Meanwhile, the electronic device 100 may generate display data 810-2 to allow a content 810-1 displayed on the screen of the electronic device 100 to be displayed in the screen having the target screen size 831 and 833 in the screen share mode.

Figure 9:
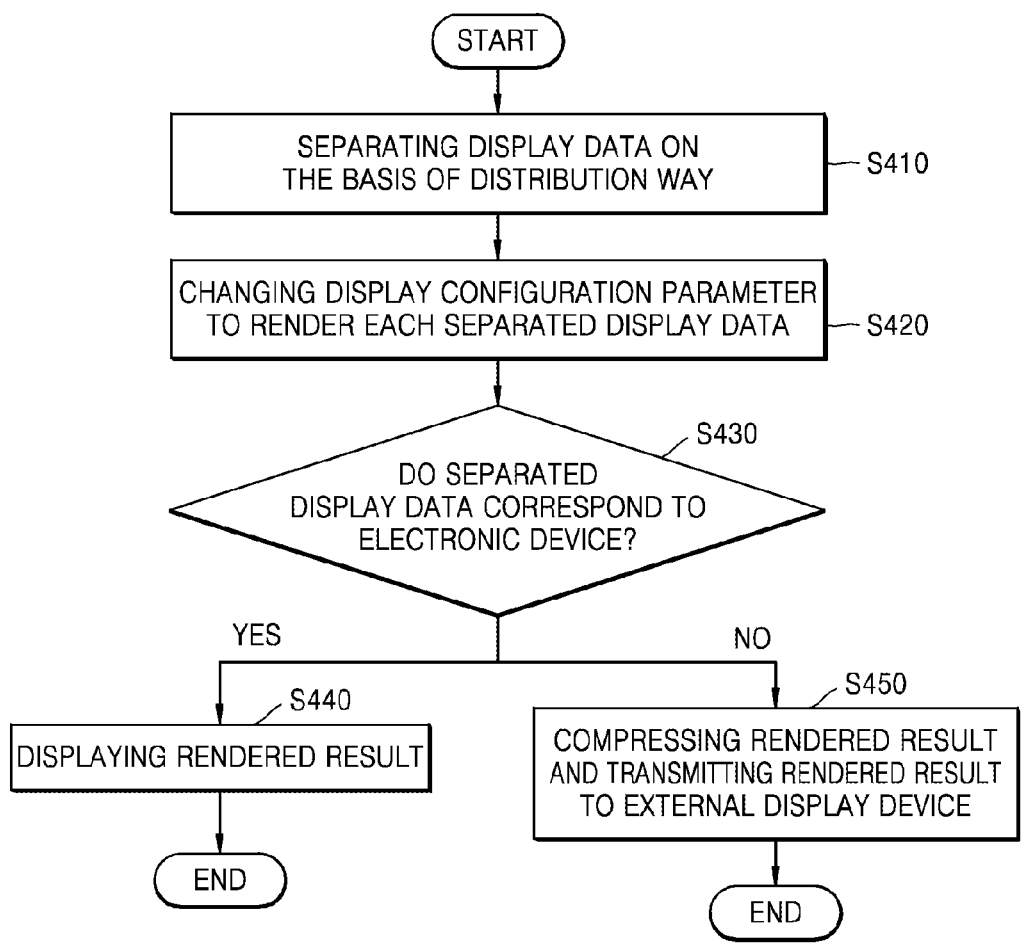
FIG. 9 shows a flowchart of a method of transmitting a portion of the display data to the external display device by the electronic device 100 in the screen share mode.

FIG. 9 shows a flowchart of a method of transmitting a portion of the display data to the external display device by the electronic device 100 in the screen share mode.

Referring to FIG. 9, the electronic device 100 may separate the display data into each area on the basis of the distribution way (S410). For instance, in case of the single-line distribution way as shown in FIG. 7B, the electronic device 100 may separate the display data into two portions with respect to the width of the target screen size. In addition, in case of the two-by-two square distribution way as shown in FIG. 8B, the electronic device 100 may separate the display data into four portions with respect to the width and height of the target screen size. Meanwhile, the separated display data may have the same size, i.e., the screen size of the electronic device 100.

The electronic device 100 may change the display configuration parameter to render the separated display data (S420). For instance, the electronic device 100 may change the display configuration parameter to allow the separated display data to be displayed after being rendered. As another way, the electronic device 100 may change the display configuration parameter such that the display data are rendered after being zoomed into areas corresponding to the separated display data. In addition, the electronic device 100 may check whether the separated display data correspond to the electronic device 100 or the external display device (S430). In the case that the separated display data correspond to the electronic device 100, the electronic device 100 may display the rendered result in accordance with the display configuration parameter (S440). Meanwhile, in the case that the separated display data correspond to the external display device, the electronic device 100 may transmit the rendered result to the external display device after compressing the rendered result (S450).

As described above, the electronic device 100 may repeatedly perform the operations S420 to S450 on each of the separated display data, and thus each of the separated display data may be displayed through the electronic device 100 or transmitted to the external display device 200.

Figure 10A:
FIG. 10A shows an example of a content 1010 displayed through the electronic device 100 and the external display device 200.

FIG. 10A shows an example of a content 1010 displayed through the electronic device 100 and the external display device 200.

Figure 10B:
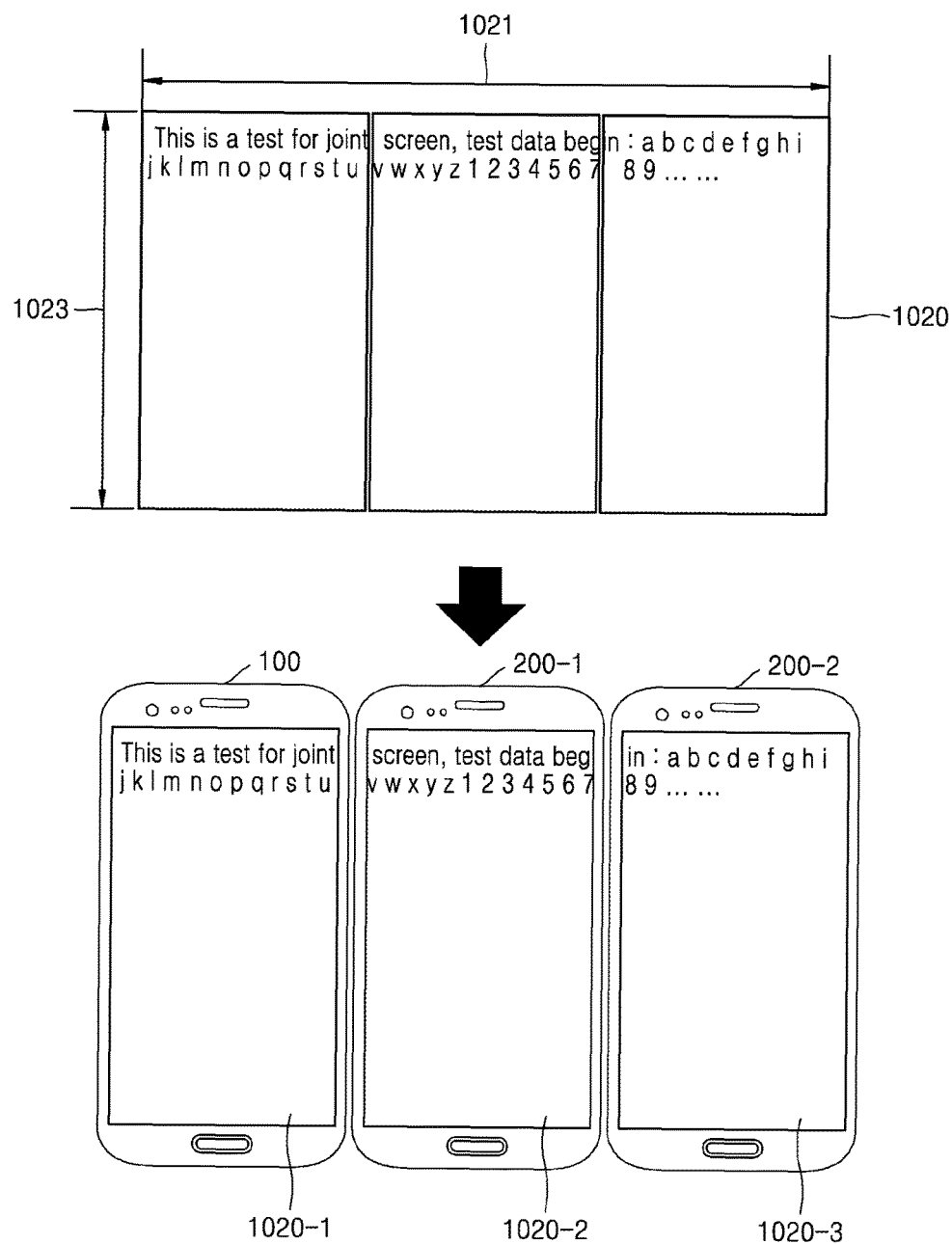
FIGS. 10B and 10C show examples of the content 1010 of FIG. 10A displayed through the electronic device 100 and the external display device in accordance with a distribution way of the external display device.
Figure 10C:
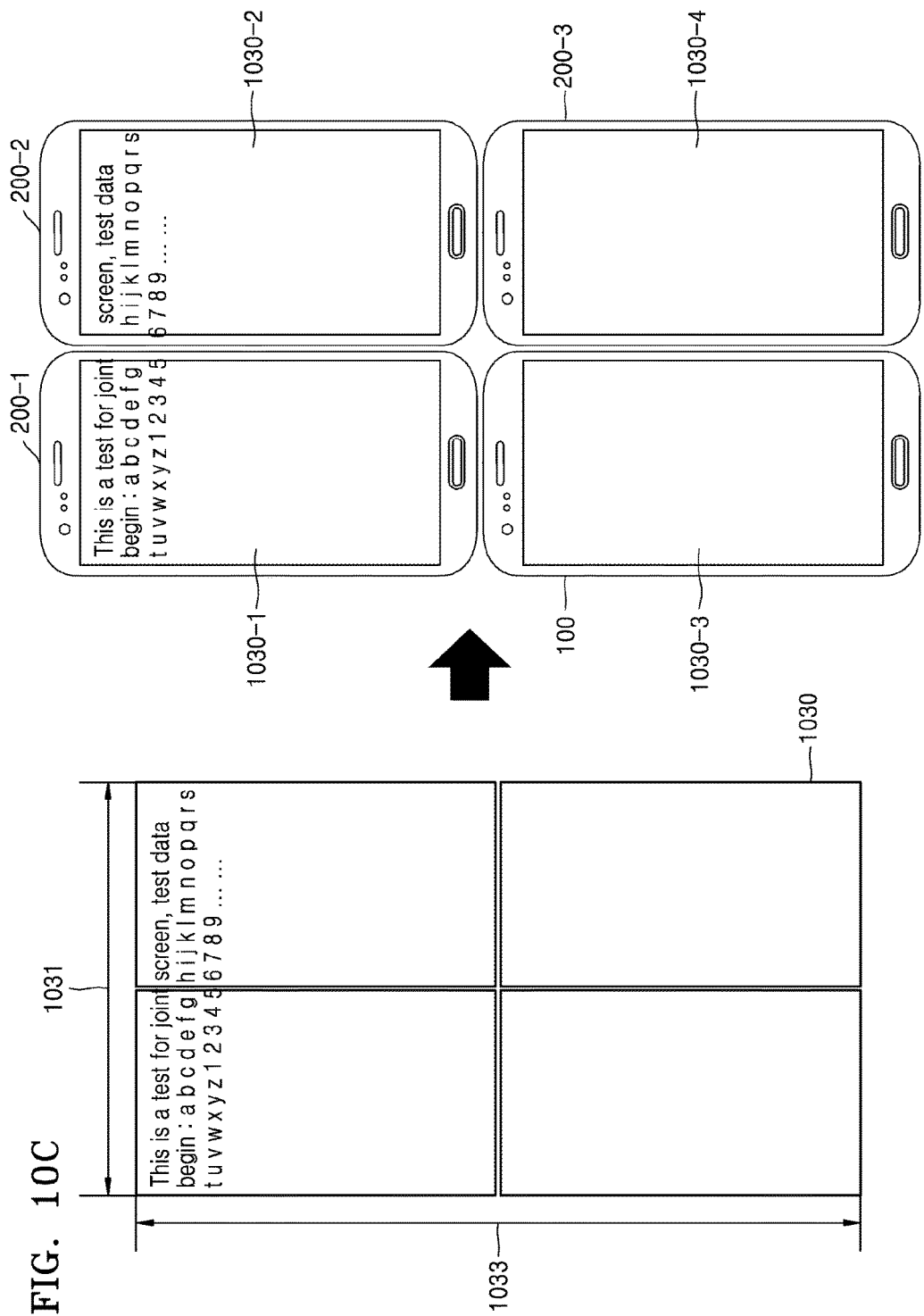

FIGS. 10B and 10C show examples of the content 1010 of FIG. 10A displayed through the electronic device 100 and the external display device in accordance with a distribution way of the external display device.

Referring to FIG. 10B, the electronic device 100 may determine a target screen size 1021 and 1023 obtained by increasing a screen width of the electronic device 100 by about three times in accordance with the arrangement of the external display devices 200-1 and 200-2. The electronic device 100 may generate display data 1020 to display the content 1010 of FIG. 10A through the screen having the target screen size 1021 and 1023. In addition, the electronic device 100 may separate the display data 1020 in accordance with a single-line distribution way of the external display devices 200-1 and 200-2. The separated display data 1020-1, 1020-2, and 1020-3 may be substantially simultaneously displayed through the electronic device 100 and the external display devices 200-1 and 200-2.

Referring to FIG. 10C, the electronic device 100 may determine a target screen size 1031 and 1033 obtained by increasing each of the width and height of the screen of the electronic device 100 by about two times in accordance with the arrangement of the external display devices 200-1 to 200-3. The electronic device 100 may generate display data 1030 to display the content 1010 of FIG. 10A through the screen having the target screen size 1031 and 1033. In addition, the electronic device 100 may separate the display data 1030 in accordance with a two-by-two square distribution way of the external display devices 200-1 to 200-3. The separated display data 1030-1 to 1030-4 may be substantially simultaneously displayed through the electronic device 100 and the external display devices 200-1 to 200-3.

As described above, the electronic device 100 according to the present embodiment may change the display configuration parameter, and thus the content displayed through the screen of the electronic device 100 may be displayed to correspond to the screen size (i.e., the target screen size) of the devices sharing the screen without enlarging or reducing the content displayed through the screen of the electronic device 100. Thus, when the number of the external display devices sharing the screen increases, the user may be provided with the content, which contains more information.

Figure 11:
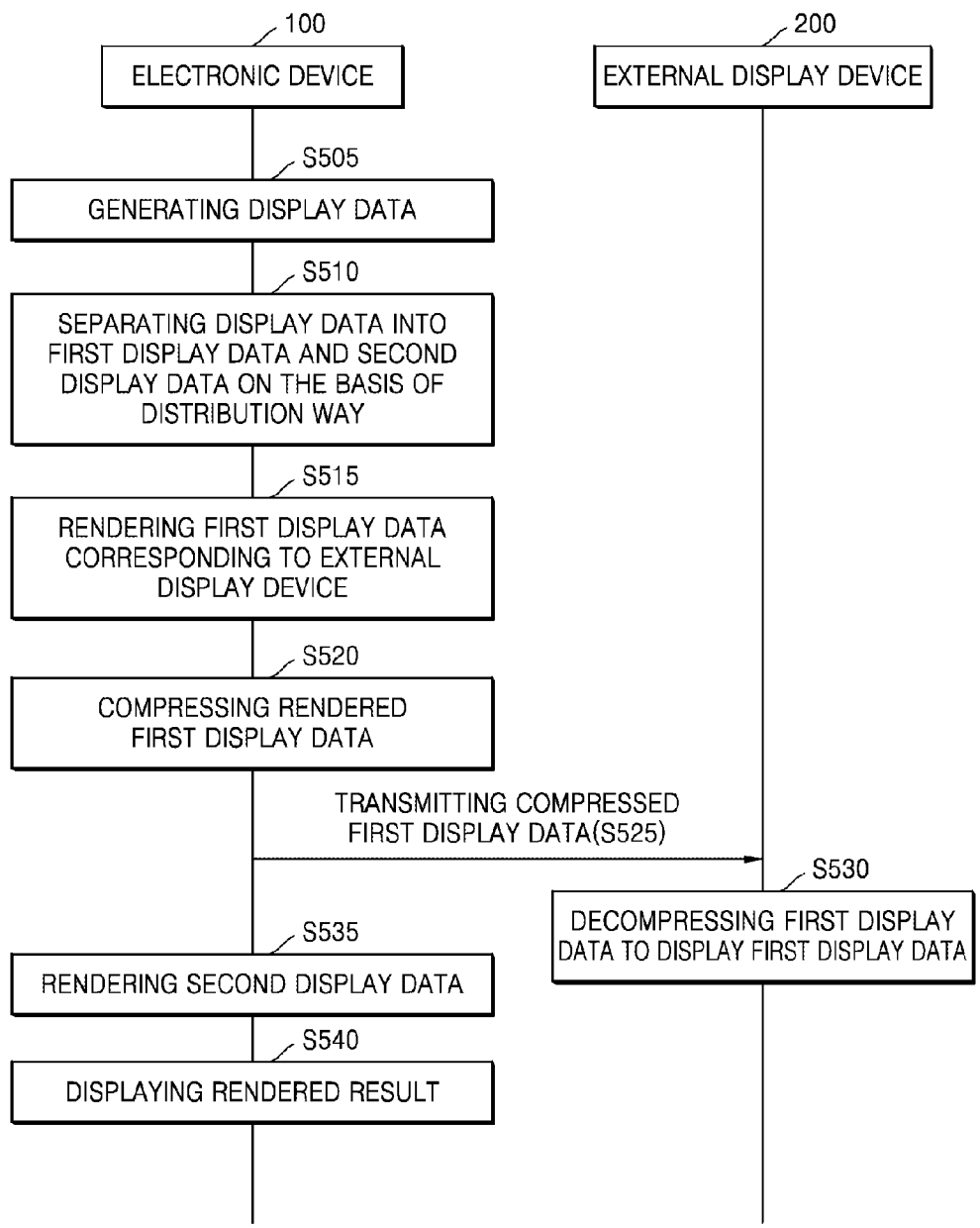
FIG. 11 shows a flowchart of a method of sharing the screen by the electronic device 100 and the external display device in the screen share mode to display a piece of content.

FIG. 11 shows a flowchart of a method of sharing the screen by the electronic device 100 and the external display device in the screen share mode to display one content.

According to the present embodiment, the electronic device 100 may generate display data about a size corresponding to a target screen size (S505). The method of generating the display data by the electronic device 100 is described with reference to FIG. 6, and thus details thereof will be omitted. The electronic device 100 may separate the display data into first display data and second display data having the same size as that of the first display data on the basis of a distribution way of the electronic device 100 (S510). The electronic device 100 may render the first display data corresponding to the external display device 200 (S515). In addition, the electronic device 100 may compress the rendered first display data using an encoder (S520). In addition, the electronic device 100 may transmit the compressed first display data to the external display device 200 (S525). The external display device 200 may decompress the compressed first display data and display the decompressed first display data (S530).

Meanwhile, the electronic device 100 may render the second display data after rendering the first display data (S535). Since the second display data correspond to the electronic device 100, the electronic device 100 may display the rendered second display data without compressing the rendered result (S540). As described above, the electronic device 100 and the external display device 200 may share the screen and display one display data through the shared screen.

Figure 12:
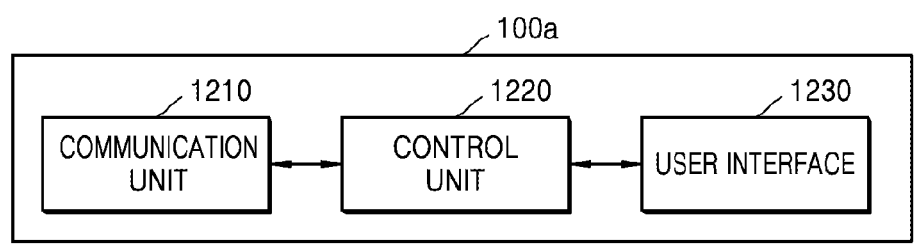
FIG. 12 shows a block diagram of an electronic device 100a according to an embodiment.

FIG. 12 shows a block diagram of an electronic device 100*a* according to an embodiment. Referring to FIG. 12, the electronic device 100*a* may include a communication interface 1210 corresponding to the communication interface 110 of FIG. 1, a controller 1220 corresponding to the controller 120 of FIG. 1, and a user interface 1230 receiving the user input.

According to the present embodiment, the communication interface 1210 may communicate with various external devices through various communication methods. For example, the communication interface 110 may communicate with external display devices through at least one of Wi-Fi, Bluetooth, wireless communication, near field communication (NFC), or the like.

The communication interface 1210 may receive a screen size information of the external display device from the external display device disposed adjacent to the communication interface 1210. The screen size information may include information on a height and a width of the screen of the external display device. The communication interface 1210 may provide the screen size information of the external display device to the controller 1220.

In addition, the communication interface 1210 may receive information about an event occurring in the external display device from the external display device. Here, the event may mean an operation generated by the user to allow a program to respond or an occurrence of event. For example, the event may be a touch gesture or a touch input from the user. The information about the event may include an event type, coordinate information of the screen on which the event occurs, or the like. The communication interface 1210 may provide the controller 1220 with information about the received event.

The controller 1220 may set a display mode on the basis of the screen size information of the external display device and screen size information of the electronic device 100*a* provided from the communication interface 1210. For example, the controller 1220 may set an independent screen mode in a case that the screen size of the external display device is different from the screen size of the electronic device 100*a*. The independent screen mode may be a mode in which the electronic device 100 and the external display device display a plurality of contents related to each other through the screen of each device. It will be understood that the independent screen mode may be set even though the screen size of the external display device is substantially the same as the screen size of the electronic device 100*a* by one of ordinary skill in the art to which this invention belongs. For instance, the controller 1210 may set the independent screen mode on the basis of the user set. According to an embodiment, the controller 120 may provide a user interface used to receive a user input and set the independent screen mode in response to the user input when the controller 1220 receives the user input through the user interface. The controller 1220 may set the target screen size corresponding to the screen size of the electronic device 100*a* or the screen size of the external display device in the independent screen mode.

The controller 1220 may change a display configuration parameter of the electronic device 100*a* such that the screen size of the electronic device 100*a* corresponds to the target screen size. Here, the display configuration parameter may be a control parameter used to control at least one hardware related to the display or a parameter with respect to a hardware attribute value. For example, the controller 1220 may change the display configuration parameter such that an LCD size corresponds to the target screen size. In addition, the controller 1220 may change the display configuration parameter to change an attribute value of the graphic processing unit (GPU) such that the screen size of the electronic device 100*a* corresponds to the target screen size. Since the display configuration parameter is changed, the controller 120 may perform an operation related to the display in accordance with the target screen size regardless of a real screen size of the electronic device 100*a*.

The user interface 1230 may receive the user input. For instance, the user interface 1230 may include at least one of a key, a touch sensor, a pen recognition panel, a bending sensor, a biometric signal sensing sensor, and a microphone or a combination thereof. According to the present embodiment, the user interface 1230 may be provided with a content including GUI (graphic user interface). Meanwhile, the touch gesture or the touch input of the user may include tap, touch and hold, double tap, drag, fanning, flick, drag and drop, etc.

The user interface 1230 may receive the user input to control the electronic device 100*a*. For example, the user interface 1230 may receive instructions to turn on/off the electronic device 100, instructions to run applications, and a user input with respect to the application. In addition, the user interface 1230 may receive a user input to display a predetermined content through the screen of the external display device. For instance, the user interface 1230 may receive the user input of selecting one object from the screen through which a first content including a plurality of contents is displayed. As another way, the user interface 1230 may receive the user input of dragging the screen to a direction in which the external display device is placed in the screen through which the first content is displayed.

Responsive to the user input provided through the screen through which the first content is displayed, the controller 1220 may generate display data in accordance with the display configuration parameter to display a second content related to the first content. The display data may include pixel information corresponding to the target screen size and used to display the second content on the screen. According to the present embodiment, the controller 1220 may generate the display data through a new process or thread. As another way, the controller 1220 may generate the display data through a process or thread processing an existing content. In addition, the controller 1220 may perform an operation corresponding to the event provided from the communication interface 1210, and then the controller 1220 may generate corresponding display data.

Figure 13:
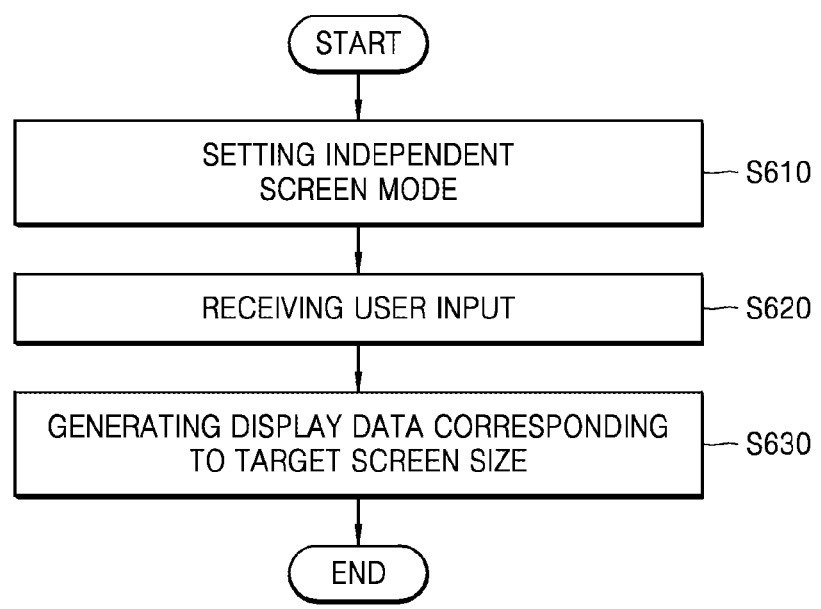
FIG. 13 shows a flowchart of a method of generating display data by the electronic device 100a in an independent screen mode.

FIG. 13 shows a flowchart of a method of generating display data by the electronic device 100*a* in an independent screen mode.

According to the present embodiment, the electronic device 100*a* may receive screen size information of the external display device disposed adjacent to the electronic device 100*a* from the external display device. The screen size information may include information on the height and width of the screen of the external display device. The electronic device 100*a* may check whether the screen size of the external display device is substantially the same as the screen size of the electronic device 100*a*. Here, the expression that the screen size of the electronic device 100*a* is the same as the size of the external display device may mean a case that a difference in height between the screens of the devices and a difference in width between the screens of the devices are in a predetermined tolerance range.

In a case that the screen size of the electronic device 100*a* is different from the screen size of the external display device, the electronic device 100*a* may set the display mode to the independent screen mode (S610). In addition, the electronic device 100*a* may set the target screen size to the screen size of the external display device. Then, the electronic device 100*a* may receive the user input (S620). For instance, the electronic device 100*a* may receive the user input of dragging the screen to the direction in which the external display device is placed. As another way, the electronic device 100*a* may receive the user input generated when the user taps the screen. The electronic device 100*a* may change the display configuration parameter in accordance with the user input such that the screen size of the electronic device 100*a* corresponds to the target screen size. The display configuration parameter may be the control parameter used to control at least one hardware related to the display or the parameter with respect to the hardware attribute value. For example, the electronic device 100*a* may change the display configuration parameter such that the LCD size of the electronic device 100*a* corresponds to the target screen size. In addition, the electronic device 100*a* may change the display configuration parameter to change the attribute value of the graphic processing unit (GPU) such that the screen size of the electronic device 100*a* corresponds to the target screen size.

The electronic device 100*a* may generate the display data corresponding to the target screen size in accordance with the display configuration parameter (S630). According to the present embodiment, the electronic device 100*a* may generate the display data through the new process or thread. For example, the electronic device 100*a* may receive the user input generated when the user taps the screen through which the content processed by a first process (or a first thread) is displayed. The electronic device 100*a* may generate the display data through a second process (or a second thread) in response to the user input to display a new content corresponding to the target screen size through the screen. Further, the electronic device 100*a* may receive the user input of dragging the screen from the screen through which the content processed by the first process is displayed. Responsive to the user input, the electronic device 100*a* may generate the display data corresponding to the target screen size and used to display the first content on the screen through the second process. The electronic device 100*a* may compress the display data generated through the second process and transmit the compressed display data to the external display device.

As another way, the electronic device 100*a* may generate the display data through a conventional process or thread. For example, the electronic device 100*a* may receive the user input of dragging the screen from the screen through which the first content processed by the first process is displayed. Responsive to the user input, the electronic device 100*a* may generate the display data through the first process to display the second content corresponding to the target screen size and related to the first content on the screen. In this case, the electronic device 100*a* may compress the generated display data through the first process and transmit the compressed display data to the external display device.

Meanwhile, in the above-description, the generated display data are transmitted to the external display device without being displayed in the electronic device 100*a*, but they should not be limited thereto or thereby. That is, the generated display data may be transmitted to the external display device after being displayed in the electronic device 100*a*. The display data transmitted to the external display device may be displayed in the external display device in accordance with the hardware configuration parameter of the external display device.

Figure 14A:
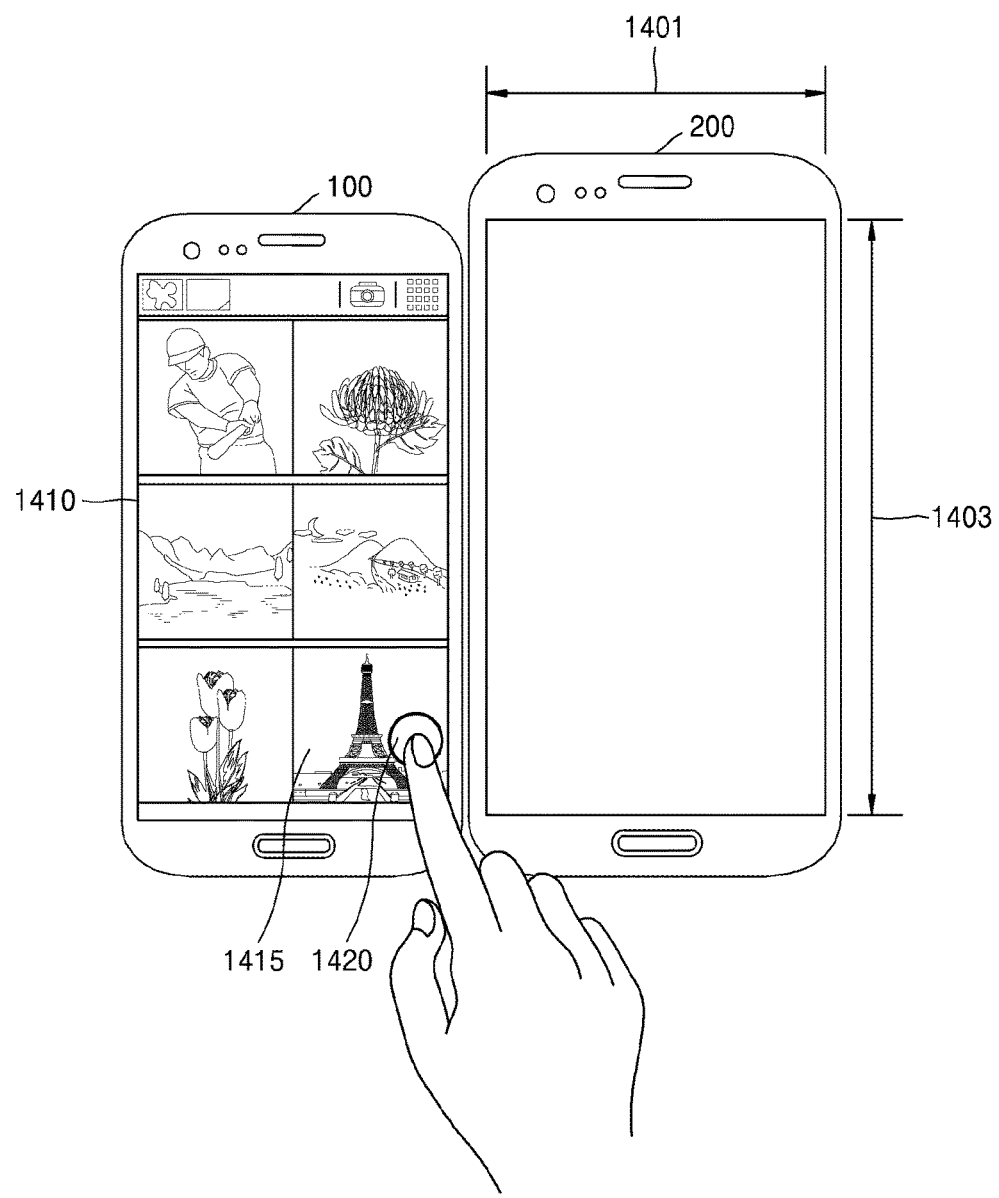
FIGS. 14A and 14B show an example of the electronic device 100a that shares the screen with the external display device in the independent screen mode in response to a user input.
Figure 14B:
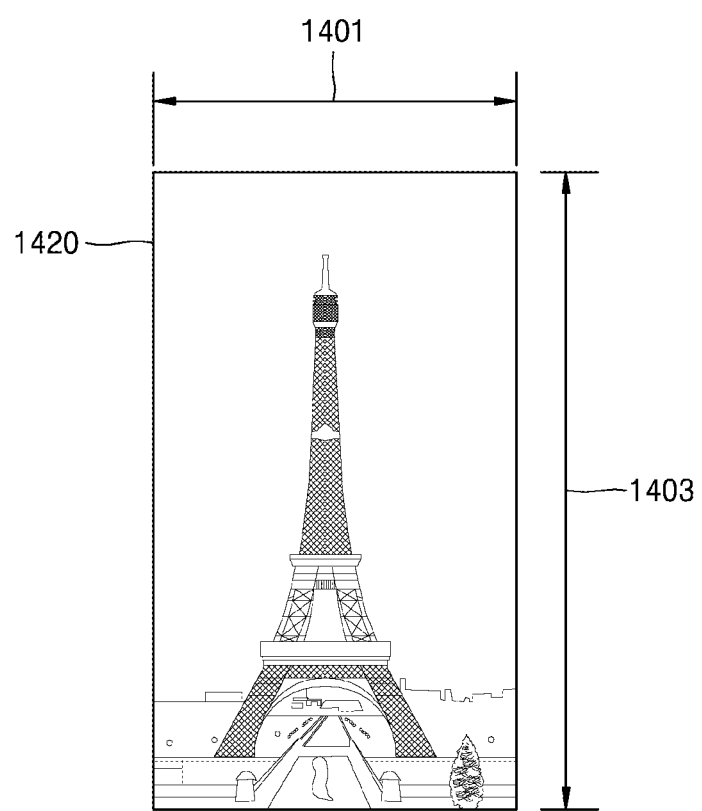

FIGS. 14A and 14B show an example of the electronic device 100*a* that shares the screen with the external display device in the independent screen mode in response to a user input.

As shown in FIG. 14A, the electronic device 100*a* may receive a user tap input 1410 of selecting one photo list 1415 in a screen 1410 through which a first content including photo lists is displayed. In this case, a second content corresponding to the user tap input 1410 may be displayed through the external display device 200.

For instance, in the case that the user tap input 1410 is received, the electronic device 100*a* may change the display configuration parameter such that the screen size of the electronic device 100*a* corresponds to a target screen size 1401 and 1403. Here, the target screen size is the screen size 1401 and 1403 of the external display device. As shown in FIG. 14B, the electronic device 100*a* may generate display data 1420 corresponding to the target screen size 1401 and 1403 through a new process to display the second content on the screen. In this case, the electronic device 100*a* may transmit the display data 1420 generated through the new process to the external display device 200 while continuously displaying the first content through the conventional process processing the first content.

Figure 15:
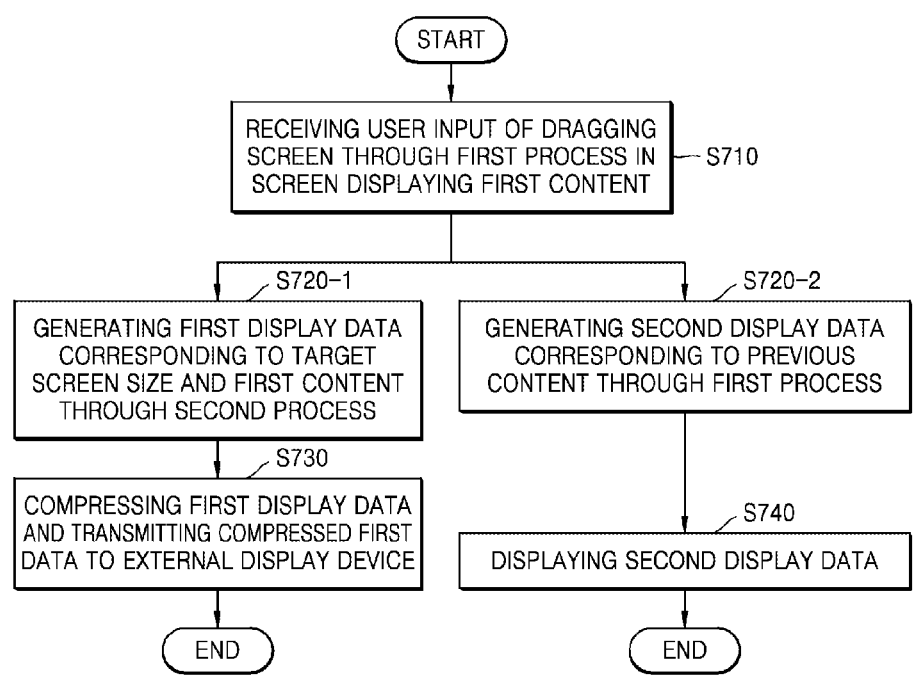
FIG. 15 shows a flowchart of a method of generating the display data by the electronic device 100a through a parallel processing in the independent screen mode.

FIG. 15 shows a flowchart of a method of generating the display data by the electronic device 100*a* through a parallel processing in the independent screen mode.

Referring to FIG. 15, the electronic device 100*a* may receive a user input of dragging a screen to a direction in which an external display device is placed from the screen through which a first content is displayed (S710). Here, the first content may be processed by a first process of the electronic device 100*a*. The electronic device 100*a* may generate first display data corresponding to the target screen size through a second process to display the first content through the screen (S720-1). The second process may be a new process or thread. Meanwhile, the electronic device 100*a* may generate second display data corresponding to the screen size of the electronic device 100*a* through the first process to display a content prior to the first content on the screen (S720-2). In this case, the display configuration parameter of the electronic device 100*a* may be set such that the screen size of the electronic device 100*a* corresponds to the target screen size (i.e., the screen size of the external display device). Accordingly, the electronic device 100*a* may change the display configuration parameter such that the second display data are zoomed in or out on the basis of the screen size of the electronic device 100*a* to be rendered. Meanwhile, the electronic device 100*a* may parallel-process the operations S720-1 and S720-2 respectively through different processes.

The electronic device 100*a* may compress the first display data generated through the second process and transmit the compressed first display data to the external display device (S730). In addition, the electronic device 100*a* may display the second display data generated through the first process (S740). As described above, the user may receive the image displayed in the electronic device 100*a* through the external display device and receive the previously-displayed image through the screen of the electronic device 100*a*.

Figure 16B:
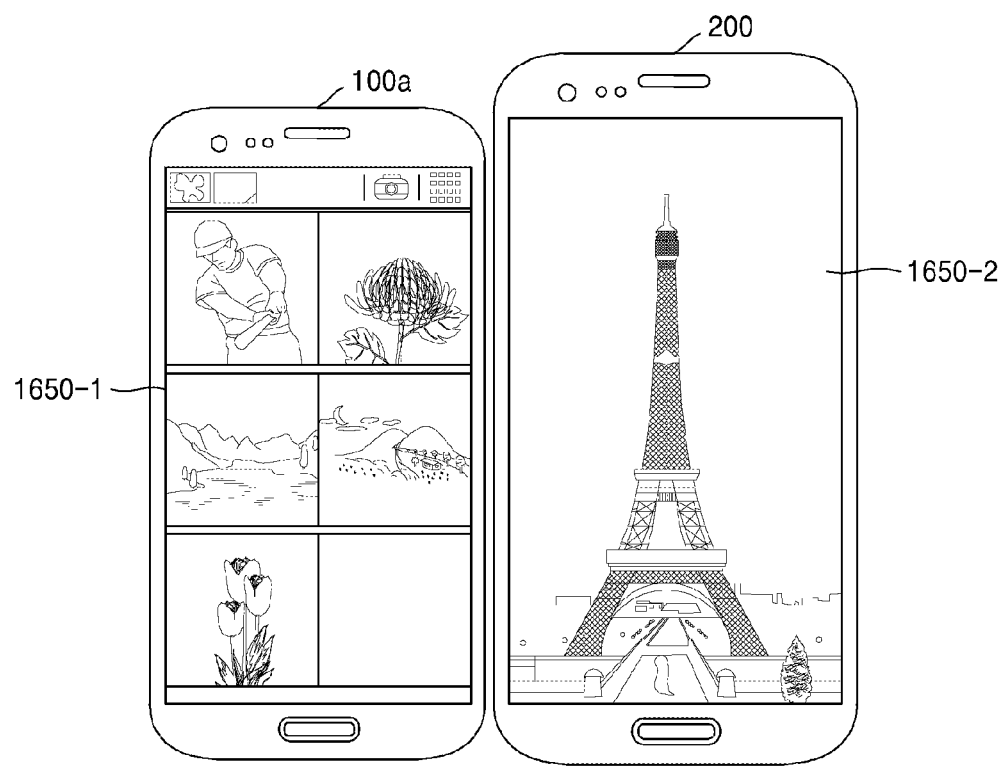
FIG. 16B shows an example of the electronic device 100a and the external display device 200 respectively displaying a plurality of contents.

FIG. 16A shows an example of the electronic device 100*a* generating the display data through the parallel processing in the independent screen mode, and FIG. 16B shows an example of the electronic device 100*a* and the external display device 200 respectively displaying a plurality of contents.

Referring to FIG. 16A, responsive to a user tap input 1620 of selecting one photo in a screen 1610 including a photo list, the electronic device 100*a* may enlarge the selected photo and display the enlarged photo (1600-1). For the convenience of explanation, the selected photo is referred to as a first content. The electronic device 100*a* may process the screen including the photo list and the first content through a first process (or a first thread).

The electronic device 100*a* may receive a drag input 1640 dragging the screen to a direction in which the external display device 200 is placed in a screen 1630 through which the first content is displayed (1600-2). Referring to 1600-3 of FIG. 16A, the electronic device 100*a* may generate first display data 1650-1 corresponding to a target screen size 1605 and 1607 through the second process in response to the drag input 1640 to display the first content on the screen. Meanwhile, the electronic device 100*a* may generate second display data 1650-2 corresponding to a screen size 1601 and 1603 of the electronic device 100*a* through the conventional first process to display a previously displayed content (e.g., the photo list) on the screen. The electronic device 100*a* may compress the first display data 1650-1 through the first process and transmit the compressed first display data 1650-1 to the external display device 200. The electronic device 100*a* may display the second display data 1650-2 through the first process. Meanwhile, the operations respectively performed in the first and second processes may be parallel processed.

Consequently, as shown in FIG. 16B, the first display data 1650-1 may be displayed through the external display device 200, and the second display data 1650-2 may be displayed through the electronic device 100*a*.

Figure 17:
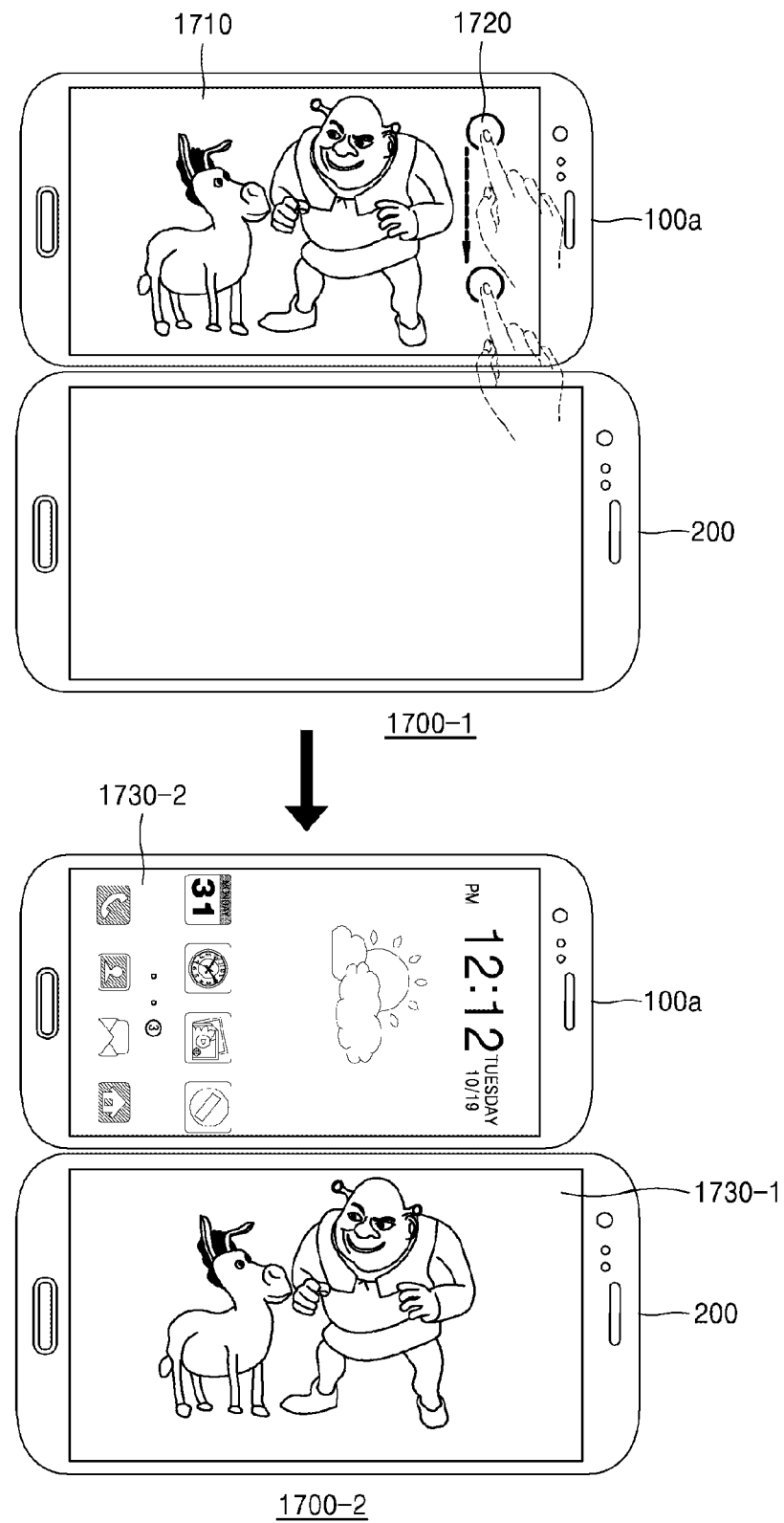
FIG. 17 shows another example of the electronic device 100a generating the display data through the parallel processing in the independent screen mode.

FIG. 17 shows another example of the electronic device 100*a* generating the display data through the parallel processing in the independent screen mode.

Referring to FIG. 17, the electronic device 100*a* may receive a drag input 1720 of dragging a screen to a direction in which an external display device 200 is located in a screen 1710 through which a video content is displayed (1700-1). The video content may be processed through a first process of the electronic device 100*a*. Then, the electronic device 100*a* may determine a target screen size to be equal to a screen size of the external display device 200 and change a display configuration parameter such that a screen size of the electronic device 100*a* corresponds to the target screen size. Then, the electronic device 100*a* may generate first display data 1730-1 corresponding to the target screen size through a new second process to display the video content on the screen. In addition, the electronic device 100*a* may generate second display data 1730-2 through the conventional first process to display a home screen of the electronic device 100*a* corresponding to the screen size of the electronic device 100*a*. The first display data 1730-1 may be displayed through the external display device 200, and the second display data 1730-2 may be displayed through the electronic device 100*a* (1700-2). As described above, the user may continuously receive the video content through the external display device 200 and substantially simultaneously perform a new application through the home screen of the electronic device 100*a*.

As described above, the electronic device 100*a* according to the present embodiment may provide the display data including the pixel information to the external display device 200 regardless of the platform (e.g., android, window, etc.) of the external display device, and thus the contents may be displayed through the screen of the external display device. In addition, the electronic device 100*a* may rapidly display the contents through the electronic device 100*a* and the external display device 200 by using the parallel processing manner.

Figure 18:
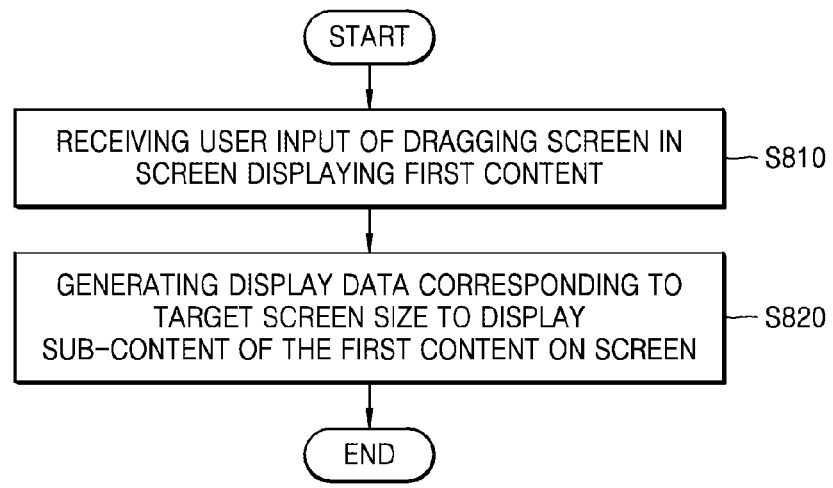
FIG. 18 shows a flowchart of a method of generating the display data through a single process or thread by the electronic device 100a in the independent screen mode.

FIG. 18 shows a flowchart of a method of generating the display data through a single process or thread by the electronic device 100*a* in the independent screen mode.

According to the present embodiment, the electronic device 100*a* may receive a user drag input of dragging a screen from the screen through which a first content is displayed (S810). In this case, a direction of the drag input may be a direction in which an external display device 200 is placed. The electronic device 100*a* may change a display configuration parameter in accordance with the drag input such that a screen size of the electronic device 100*a* corresponds to a target screen size. In addition, the electronic device 100*a* may generate first display data corresponding to the target screen size through a process (or thread) processing the first content to display a sub-content of the first content through the screen (S820). The electronic device 100*a* may compress the generated first display data and transmit the compressed first display data to the external display device.

In addition, the electronic device 100*a* may perform additional operation to continuously display the first content through the electronic device 100*a*. According to the present embodiment, the electronic device 100*a* may change the display configuration parameter such that the screen size of the electronic device 100*a* is changed to the target screen size and the screen size of the electronic device 100*a* corresponds to the target screen size. In addition, the electronic device 100*a* may generate and display second display data on the basis of the changed display configuration parameter to display the first content through the screen. As another way, the electronic device 100 may generate second display data to display the first content through the screen without changing the target screen size. In this case, the electronic device 100*a* may change the display configuration parameter such that the second display data are rendered after being zoomed in or zoomed out to correspond to the screen size of the electronic device 100*a*. The electronic device 100*a* may display the zoomed-in or zoomed-out second display data.

As described above, in the case that the parallel processing is impossible, the electronic device 100*a* may provide the related contents to the electronic device 100*a* and the external display device through the above-mentioned method.

FIG. 19 shows an example of the electronic device 100*a* generating the display data through the single process or thread in the independent screen mode.

Referring to FIG. 19, the electronic device 100*a* may receive a drag input 1820 of dragging a screen to a direction in which an external display device 200 is placed in a screen 1910-1 through which a configuration set-up menu is displayed. The electronic device 100*a* may generate first display data 1940 corresponding to the target screen size to display a sub-menu of a menu 1920 applied with the drag input 1820 through the screen. The electronic device 100*a* may compress the generated first display data 1940 and transmit the compressed first display data 1940 to the external display device 200. Then, the electronic device 100*a* may generate second display data 1910-2 to continuously display the configuration set-up menu through the screen.

Figure 20:
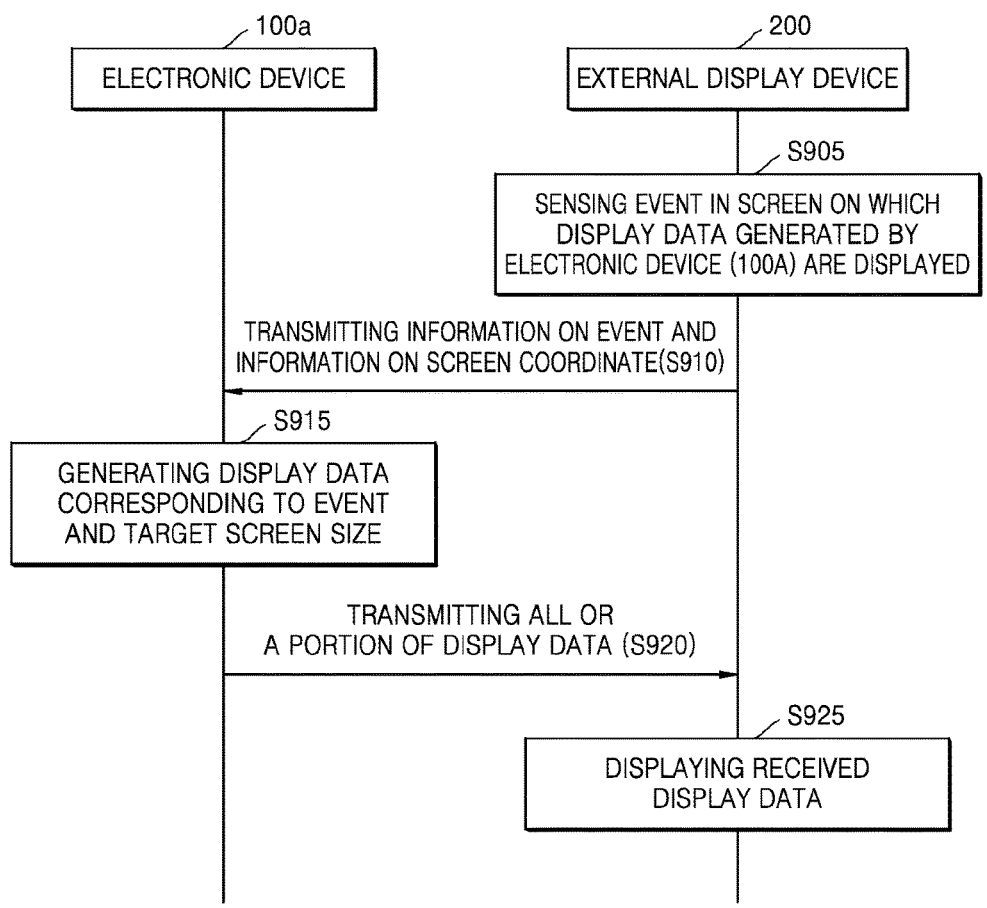

FIG. 20 shows a flowchart of a method of processing an event occurring in the external display device 200 by using the electronic device 100*a*.

According to the present embodiment, the external display device 200 may sense the event in a screen through which display data generated by the electronic device 100*a* are displayed (S905). Here, the event may indicate an operation generated by the user to allow a program to respond or an occurrence of event. For example, the event may be a touch gesture or a touch input from the user. The external display device 200 may transmit information on the sensed event to the electronic device 100*a* (S910). The information about the event may include an event type, an event identification value, coordinate information of the screen on which the event occurs, or the like. Here, the screen coordinate information may correspond to a target screen size. For example, in the case that a size of each of the electronic device 100*a* and the external display device 200 is 1024×1024 and the target screen size is 2048×1024, the received screen coordinate information may be (2000, 1000). The electronic device 100*a* may generate display data corresponding to the target screen size on the basis of the information on the event (S915). For instance, in a case that a video content is displayed through the electronic device 100*a* and the external display device 200, the external display device 200 may sense an event in which the video content jumps to an arbitrary time point and inform the sensed event to the electronic device 100*a*. The electronic device 100*a* may generate display data to display the video content corresponding to the arbitrary time point on the screen. The electronic device 100*a* may compress all (e.g., in the case of the independent screen mode) or a portion (e.g., in the case of the screen share mode) of the generated display data and transmit the compressed display data to the external display device (S920). The external display device 200 may decompress the compressed display data provided thereto and display the decompressed display data through the screen.

FIG. 21 shows an example of the electronic device 100*a* generating the display data in accordance with the event occurring in the external display device 200.

Referring to FIG. 21, the external display device 200 may receive a portion 2110-2 of display data from the electronic device 100*a* and display the portion 2110-2 of the display data in the screen share mode. The external display device 200 may receive a touch input event 2120 from the user in the screen through which the portion 2110-2 of the display data is displayed (2100-1). In addition, the electronic device 100*a* may receive information about the touch input event 2120 from the external display device 200. The received information on the touch input event 2120 may include coordinate information to which the user touch input is applied. The screen coordinate information may be coordinates corresponding to a target screen size (e.g., 2048 X2048). The electronic device 100*a* may generate display data 2130-1 and 2130-2 on the basis of the information about the event. The electronic device 100*a* may separate the generated display data 2130-1 and 2130-2 into first display data 2130-1 and second display data 2130-2 having the same size as that of the first display data 2130-1 in the screen share mode. The electronic device 100*a* and the external display device 200 may display the first display data 2130-1 and the second display data 2130-2, respectively.

Figure 22A:
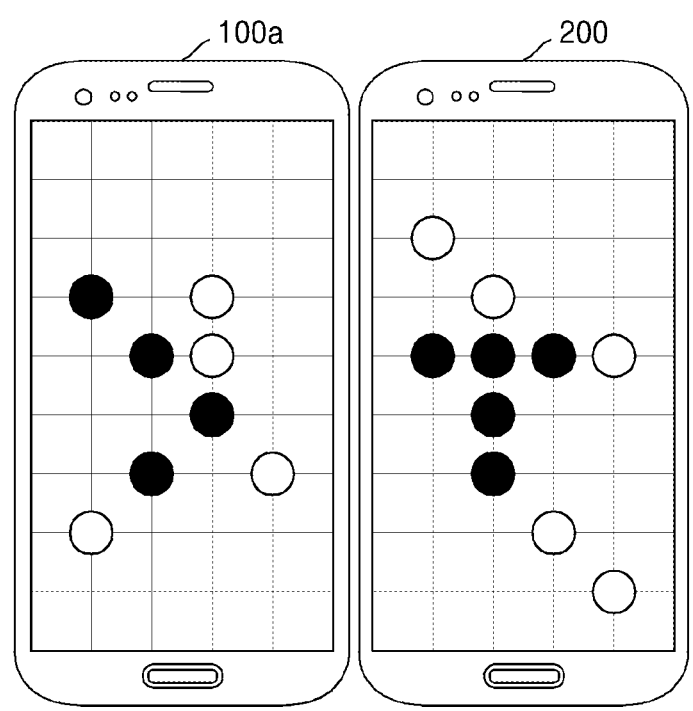
FIGS. 22A and 22B show an example of an application executed in the electronic device 100a and the external display device 200.
Figure 22B:
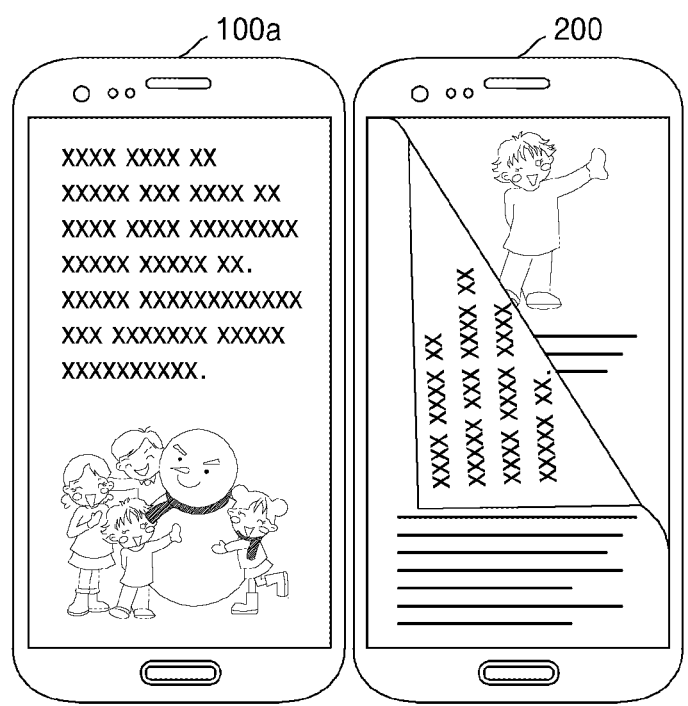

FIGS. 22A and 22B show an example of the electronic device 100*a* that shares the screen with the external display device 200.

According to the present embodiment, as shown in FIG. 22A, the electronic device 100*a* may share a screen with the external display device 200 and display an execution screen of a game application. Since the game application is executed in the electronic device 100*a*, the external display device 200 does not execute a separate game application. In addition, in this case, the user of the electronic device 100*a* may set the screen share mode regardless of the screen size of the external display device 200. A method that the electronic device 100*a* and the external display device 200 share the screen through the screen share mode regardless of the screen size will be described later with reference to FIG. 23.

The electronic device 100*a* may receive an event occurring in the electronic device 100*a* or the external display device 200 and perform an operation corresponding to the event. In addition, the electronic device 100*a* may generate display data on the basis of the operation corresponding to the event. For instance, the electronic device 100*a* may receive a user touch input event that moves a chess piece from the external display device 200 and may generate the display data to display the execution screen of the game application in which the changed position of the chess piece is reflected.

In addition, the electronic device 100a may share an execution screen of an e-book application with the external display device 200 as shown in FIG. 22B.

Figure 23:
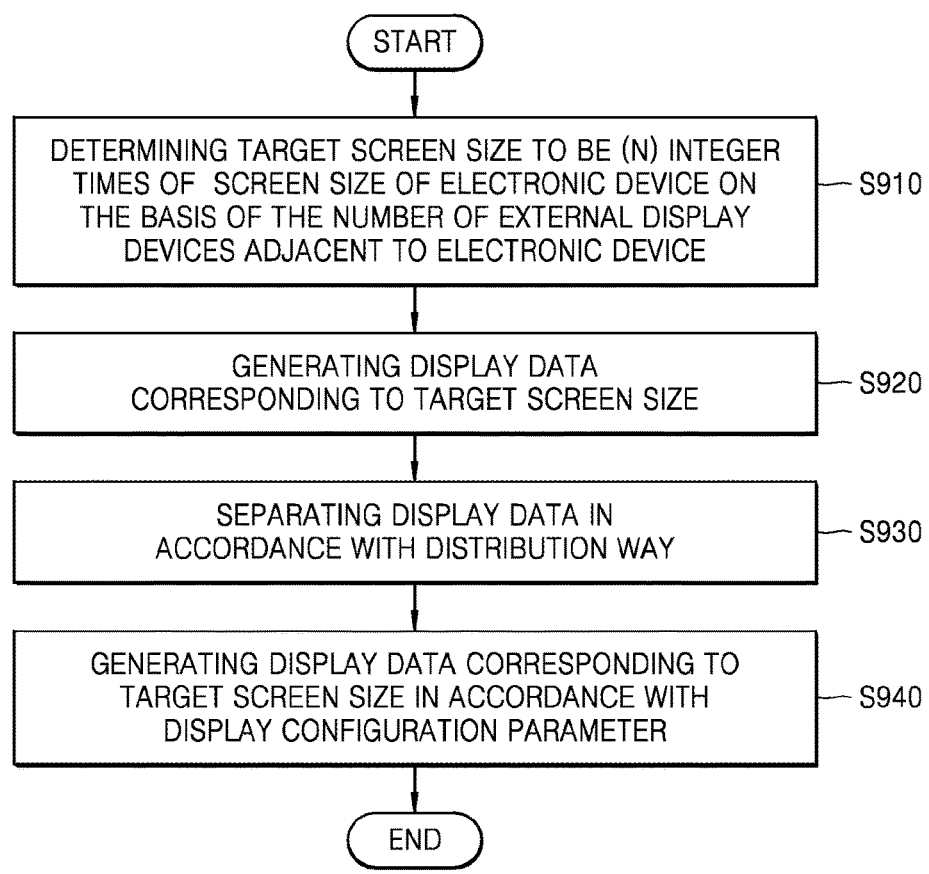

FIG. 23 shows a flowchart of a method of sharing a screen through a screen share mode in the electronic device 100a and the external display device 200 having a size different from a size of the electronic device 100a.

Referring to FIG. 23, the electronic device 100a may set the screen share mode even though the electronic device 100a and the external display device 200 have different screen sizes from each other. For instance, the electronic device 100a may set the screen share mode on the basis of the user input. In this case, the electronic device 100a may determine a target screen size on the basis of the number of the external display devices disposed adjacent to the electronic device 100a (S910). The determined target screen size may be (N) integer times of the screen size of the electronic device 100a. In addition, the electronic device 100a may determine a distribution way in accordance with an arrangement of the external display devices. For instance, in the case that the number of the adjacent external display devices is one, the electronic device 100a may determine the target screen size two times greater than the screen size of the electronic device 100a. In addition, the electronic device 100a may determine a height and a width of the target screen size in accordance with the distribution way.

The electronic device 100a may generate display data corresponding to the target screen size (S920). As an example, the electronic device 100a may change a display configuration parameter such that an LCD size of the electronic device 100a corresponds to the target screen size. As another way, the electronic device 100a may change the display configuration parameter to change GPU attribute values corresponding to the target screen size. The electronic device 100a may generate display data in accordance with the changed display configuration parameter to display a content executed in the electronic device 100a through a screen having the target screen size. In addition, the electronic device 100a may separate the generated display data in accordance with the distribution way (S930). For instance, the electronic device 100a may separate the display data into first display data and second display data. The first display data and the second display data correspond to the screen size of the electronic device 100a. Accordingly, the electronic device 100a may zoom in or zoom out display data corresponding to the external display device among the separated display data in accordance with the screen size of the external display device (S940). For instance, the electronic device 100a may change the display configuration parameter such that the second display data are zoomed in or zoomed out and rendered. The second display data, which are zoomed in or zoomed out, may be transmitted to the external display device, and the first display data may be displayed through the electronic device 100a.

Figure 24:
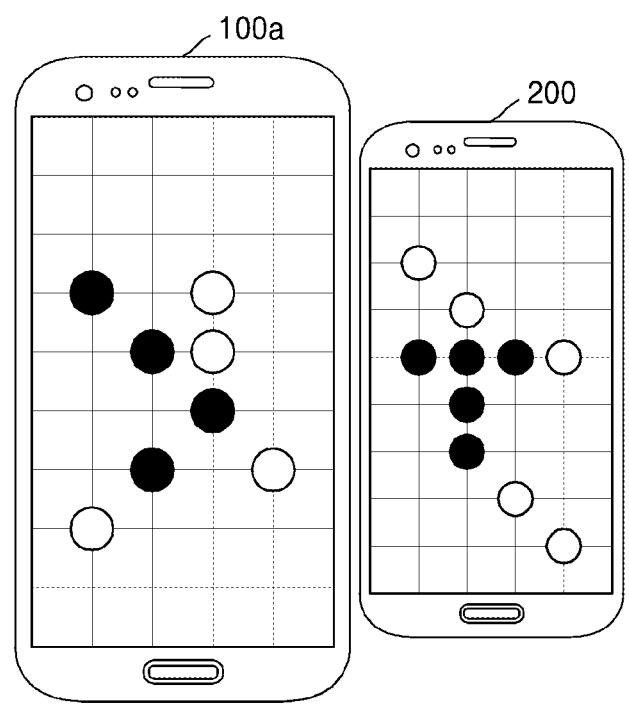
FIG. 24 shows an example of sharing the screen through the screen share mode in the electronic device 100a and the external display device 200, which have different sizes from each other.

FIG. 24 shows an example of sharing the screen through the screen share mode in the electronic device 100a and the external display device 200 which have different sizes from each other.

According to the present embodiment, as shown in FIG. 24, the electronic device 100a may display an execution screen of a game application using the external display device 200 having a screen size different from that of the electronic device 100a. Since the game application is executed in the electronic device 100a, the external display device 200 does not execute a separate game application.

The electronic device 100a may determine the target screen size corresponding to two times of the screen size of the electronic device 100a. In addition, the electronic device 100a may generate display data corresponding to the determined target screen size to display the execution screen of the game application through the screen. The electronic device 100a may separate the display data into first display data and second display data and may zoom in the second display data corresponding to the external display device 200. The zoomed-in second display data may be transmitted to the external display device 200 and displayed through the external display device 200. The electronic device 100a may display the first display data.

Meanwhile, the electronic device 100a may receive an event from the external display device 200 and coordinate information of a position at which the event occurs. In addition, the electronic device 100a may calculate the coordinate information on the target screen size corresponding to the received coordinate information. The electronic device 100a may perform an operation corresponding to the event, and then may generate display data corresponding to the operation. The generated display data may be shared with the external display device 200 through the above-mentioned process. As described above, the user may receive the screen shared by the devices having different screen sizes and different platforms.

Figure 25:
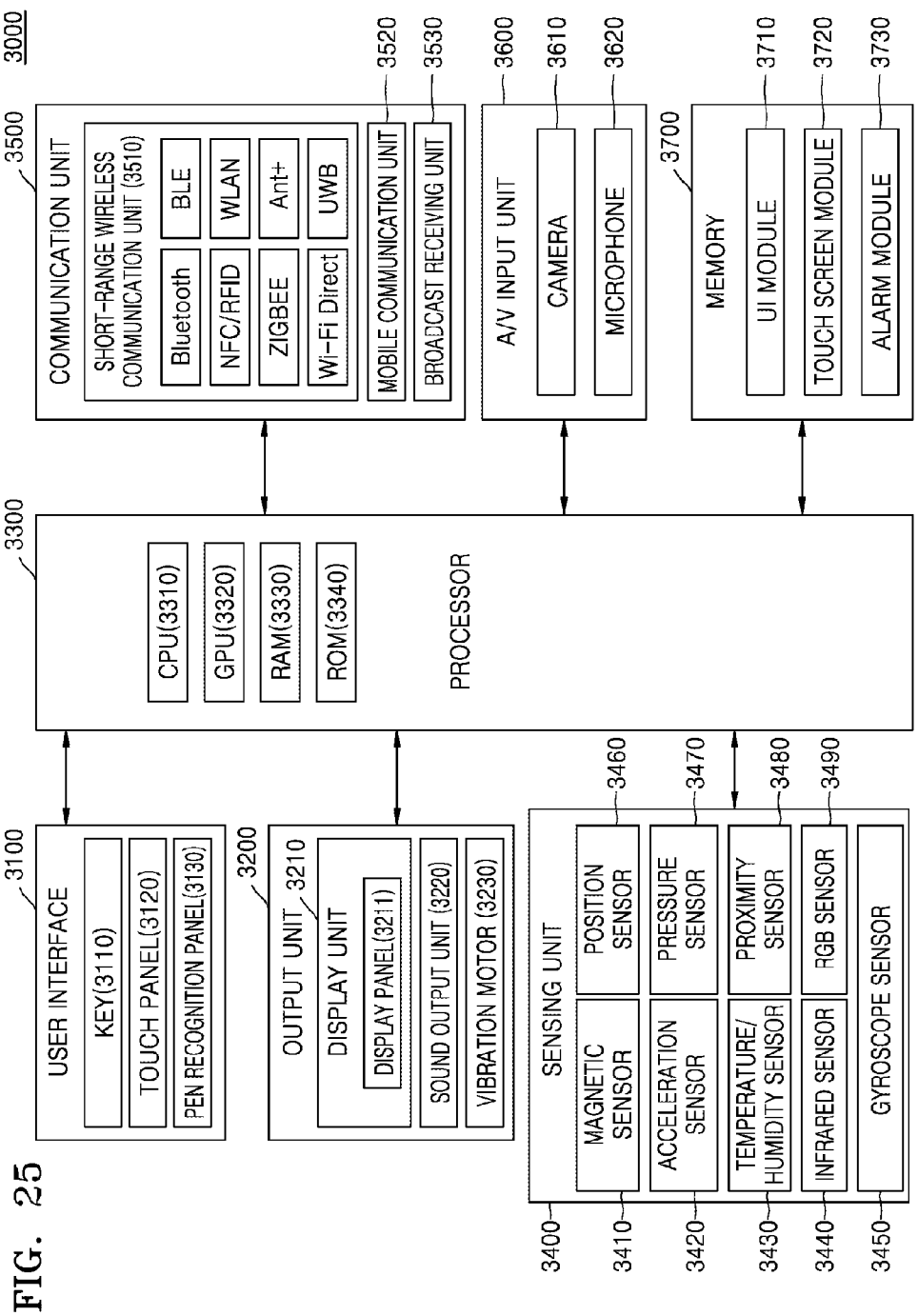
FIG. 25 shows a block diagram of an electronic device 3000 according to an embodiment.

FIG. 25 shows a block diagram of an electronic device 3000 according to an embodiment.

As shown in FIG. 25, the electronic device 3000 may be applied to a variety of electronic items, such as a mobile phone, a table PC, a PDA, an MP3 player, a kiosk, an electronic picture frame, a navigation unit, a digital TV, a wrist watch, a wearable device like a HMD (Head-Mounted Display), etc.

According to FIG. 25, the electronic device 3000 may include at least one of an user interface 3100, an output unit 3200, a processor 3300, a sensing unit 3400, a communication interface 3500, an A/V user interface 3600, and a memory 3700. The user interface 3100, the processor 3300, and the communication interface 3500 shown in FIG. 25 correspond to the user interface 1230, the controller 1220, and the communication interface 1210 shown in FIG. 12, respectively.

The user interface 3100 may receive various commands from a user. For instance, the user interface 3100 may include at least one of a key 3110, a touch panel 3120, and a pen recognition panel 3130.

The key 3110 may include various types of keys, such as a mechanical button, wheel, etc., formed in a front surface portion, a side surface portion, and a rear surface portion outside a main body of the electronic device 3000.

The touch panel 3120 may sense a user touch input and output a touch event value corresponding to the sensed touch signal. In a case that the touch panel 3120 is coupled to a display panel 3211 to form a touch screen (not shown), the touch screen may be realized by using a variety of touch sensors, e.g., a capacitive type touch sensor, a resistive type touch sensor, a piezoelectric type touch sensor, etc. The capacitive type touch sensor may sense a change of capacitance caused by a user's body when a portion of the user's body touches a surface of the touch screen using a dielectric substance coated on the surface of the touch screen to calculate a touch coordinate. The resistive type touch sensor may include two electrode plates built in the touch screen and sense a current flowing through two electrode plates making contact with each other at the touch point when the user touches the screen to calculate the touch coordinate. The touch event occurring in the touch screen may be mainly generated by a human finger, however, the touch event may be generated by an object formed of a conductive material that causes a capacitance variation.

The pen recognition panel 3130 may sense a proximity or touch input of a pen by the user who operates a touch pen (e.g., a stylus pen, a digitizer pen, etc.) and output the sensed pen proximity event or the pen touch event.

The user interface 3100 may receive the user input to display a predetermined content through the screen of the external display device. For instance, the user interface 3100 may receive the user input of selecting one object in a screen through which a first content including a plurality of objects is displayed. As another way, the user interface 3100 may receive the user input of dragging the image to the direction, in which the external display device is placed, in the screen through which the first content is displayed.

The output unit 3200 may be used to output an audio signal, a video signal, or a vibration signal and include a display 3210, a sound output unit 3220, and a vibration motor 3230.

The display 3210 may include a display panel 3211 and a controller (not shown) controlling the display panel 3211. The display panel 3211 may be, but not limited to, an LCD (liquid crystal display), an OLED (organic light emitting diode) display, an AMOLED (active-matrix organic light-emitting diode), or a PDP (plasma display panel). The display panel 3211 may be flexible, transparent, or wearable. The display 3210 may be coupled to the touch panel 3120 of the user interface 3100 and provided as the touch screen (not shown). For instance, the touch screen (not shown) may include a module in which the display panel 3211 and the touch panel 3120 are coupled to each other in a stack structure.

The display 3210 may display information processed by the electronic device 3000. As an example, the display 3210 may receive the rendered result through the processor 3300 and display the rendered result.

The sound output unit 3220 may output audio data provided from the communication interface 1500 or stored in the memory 3700. In addition, the sound output unit 3220 may output a sound signal related to functions (e.g., call signal sounds, message notification sounds, alarm sounds, etc.) performed in the electronic devices 3000. The sound output unit 3220 may include a speaker, a buzzer, etc.

The vibration motor 3230 may output the vibration signal. For instance, the vibration motor 3230 may output the vibration signal corresponding to the output of the sound data or video data (e.g., call signal sounds, message notification sounds, etc.). In addition, the vibration motor 3230 may output the vibration signal in a case that the touch is input to touch screen.

The processor 3300 may include at least one of a CPU 3310, a GPU (graphic processing unit) 3320, a RAM 3330, and a ROM 3340. The CPU 3310, the GPU 3320, the RAM 3330, and the ROM 3340 may be connected to each other through a bus.

The CPU 3310 may access the memory 3700 and perform a booting operation using an O/S stored in the memory 3700. In addition, the CPU 3310 may perform a variety of operations using programs, contents, data, etc., which are stored in the memory 3700.

The ROM 3340 may store a command set for system booting. As an example, when a power source voltage is supplied to the electronic device 3000 in response to a turn-on command, the CPU 3310 may copy the OS stored in the memory 3700 to the RAM 3330 in accordance with commands stored in the ROM 3340 and execute the OS to boot the system. When the booting of the electronic device 3000 is completed, the CPU 3310 may copy the various programs stored in the memory 3700 to the RAM 3330 and execute the programs copied to the RAM 3330 to perform various operations. When the booting of the electronic device 3000 is completed, the GPU 3320 may display an UI screen in an area of the display 3210. In detail, the GPU 3320 may generate a screen on which an electronic document including various objects, e.g., a content, an icon, a menu, etc., is displayed. The GPU 3320 may calculate attribute values, such as a coordinate value, a shape, a size, a color, etc., of each object in accordance with a layout of the screen. In addition, the GPU 3320 may calculate attribute values changed by using a display configuration parameter. The GPU 3320 may generate display data of various layouts including objects on the basis of the calculated configuration parameter. For instance, the GPU 3320 may perform a rendering operation based on the calculated attribute values, and thus the GPU 3320 may generate the display data. The display data generated by the GPU 3320 may be provided to the display 3210 and displayed through each area of the display 3210.

The sensing unit 3400 may sense a state of the electronic device 3000 or a surrounding environment of the electronic device 3000 and transmit the sensed information to the processor 3300.

The sensing unit 3400 may include at least one of a magnetic sensor 3410, an acceleration sensor 3420, a temperature/humidity sensor 3430, an infrared sensor 3440, a gyroscope sensor 3450, a positioning sensor (e.g., GPS) 3460, a pressure sensor 3470, a proximity sensor 3480, and an illuminance sensor 3490, but it should not be limited thereto or thereby. According to an exemplary embodiment, the sensing unit 3400 may be disposed on a side surface portion, a front surface portion, etc., to sense whether the external display device is adjacent to the electronic device 3000. In addition, the sensing unit 3480 may sense a relative position of the external display device disposed adjacent to the electronic device 3000. For example, the electronic device 3000 may sense whether the adjacent external display device is positioned to the right or left of (or, above or under) the electronic display device 3000 as viewed relative to the electronic display device 3000, and the electronic device 3000 may provide the processor 3300 with position information of the external display device. The processor 3300 may have the arrangement of the electronic device 3000 and the external display device through the sensing unit 3400. Meanwhile, detailed descriptions of each sensor will be omitted since the function of each sensor may be understood by one of ordinary skill in the art, to which this invention belongs, from the name of each sensor.

The communication interface 3500 may include one or more elements to allow the electronic device 3000 to communicate with the external display device or server. For instance, the communication interface 3500 may include a short-range wireless communication interface 3510, a mobile communication interface 3520, and a broadcast receiving unit 3530.

The short-range wireless communication interface 3510 may include a Bluetooth communication interface, a Bluetooth low energy (BLE) communication interface, a near field communication interface, a WLAN communication interface, a Zigbee communication interface, an infrared data association (IrDA) communication interface, a Wi-Fi Direct (WFD) communication interface, an ultra wideband (UWB) communication interface, and an Ant+ communication interface, but it should not be limited thereto or thereby.

The mobile communication interface 3520 may transmit and receive a wireless signal to and from at least one of a base station, an external terminal, and a server on a mobile communication network. Here, the wireless signal may include various types of data in accordance with the transmission and/or reception of an audio (or voice) call signal, a video phone call signal, or a text/multimedia message.

The broadcast receiving unit 3530 may receive a broadcast signal and/or information associated with broadcast through a broadcast channel. The broadcast channel may include a satellite channel and a terrestrial channel. According to embodiments, the electronic device 3000 may not include the broadcast receiving unit 3530.

The A/V (Audio/Video) user interface 3600 may include a camera 3610, a microphone 3620, etc., to input the audio signal or the video signal. The camera 3610 may capture a picture frame, such as a still image or a moving image, through an image sensor during a video call mode or shooting mode. The image captured by the image sensor may be processed by the processor 3300 or a separate image processor (not shown).

The picture frame processed by the camera 3610 may be stored in the memory 3700 or transmitted to the outside through the communication interface 3500. The A/V user interface 3600 may include two or more cameras depending on the configuration of the terminal.

The microphone 3620 may receive an external sound signal and process the received external sound signal to electric voice data. As an example, the microphone 3620 may receive the sound signal from an external device or a speaker. The microphone 3620 may utilize various noise removal algorithms to remove a noise generated during the reception of the external sound signal.

The memory 3700 may store program for the process and control operations of the processor 3300 or store input/output data (e.g., a plurality of menus, a plurality of first layer sub-menus respectively corresponding to the menus, a plurality of second layer sub-menus respectively corresponding to the first layer sub-menus, etc.).

The memory 3700 may include at least one of a flash memory type, hard disk type, multimedia card micro type, a card type memory (e.g., SD or XD memory), a random access memory (RAM), a static RAM (SRAM), a read-only memory (ROM), an electrically erasable programmable read-only memory (EEPROM), a programmable read-only memory (PROM), a magnetic memory, a magnetic disk, and an optical disk. In addition, the electronic device 3000 may operate a web storage or a cloud server that performs a storage function of the memory 3700 on internet.

Programs stored in the memory 3700 may be classified into a plurality of modules, e.g., an UI module 3710, a touch screen module 3720, an alarm module 3730, etc., according to its function.

The UI module 3710 may provide specialized UI and GUI interacting with the electronic device 3000 in accordance with each application. The touch screen module 3720 may sense the touch gesture of the user on the touch screen and transmit information on the touch gesture to the processor 3300. The touch screen module 3720 according to an embodiment of the present invention may recognize and analyze a touch code. The touch screen module 3720 may be configured by a separate hardware including a controller.

To sense the touch or proximity touch on the touch screen, a sensing value may be provided from a sensor inside the touch screen or the sensing unit 3400. As an example of the sensor for sensing the touch on the touch screen, a tactile sensor is used. The tactile sensor may sense a contact with a specific object equivalent to or greater than a human's ability to sense. The tactile sensor may sense various information such as roughness of a contact surface, rigidness of a contacting object, a temperature of a contact position, etc.

The alarm module 3730 may generate signals to notify a call signal reception, a message reception, a key signal input, a schedule notification, etc. The alarm module 3730 may output the notification signal in the form of video signal through the display 3210, output the notification signal in the form of audio signal through the sound output unit 3220, and output the notification signal in the form of vibration signal through the vibration motor 3230.

Embodiments of the present invention and all functional operations, which are described in the present specification, may be implemented by digital electronic circuit, or computer software, firm ware, or hardware including a structure disclosed in the present specification and equivalents thereof, or a combination of one or more thereof.

INDUSTRIAL APPLICABILITY

A method according to an embodiment of the present invention may be realized in a program command type executable in computers and stored in a computer-readable media. Herein, the computer-readable media may include a program command, a data file, and a data structure individually, or include the combination thereof. The program command stored in the media may be designed and constructed particularly for the present invention, or known to those skilled in computer software and usable. The computer-readable recording media may include a magnetic media (e.g., a hard disk, a floppy disk, and a magnetic tape), an optical media (e.g., a compact disc read only memory (CD-ROM) and a digital versatile disc (DVD)), a magneto-optical media (e.g., a floptical disk), and a hardware device (e.g., read only memory (ROM), random access memory (RAM), a flash memory, or the like) specifically configured to store and perform a program command. Also, the program command may include not only a machine code such as things generated by a compiler but also a high-level language code executable on a computer using an interpreter.

The following description with reference to the accompanying drawings is provided to assist in a comprehensive understanding of various embodiments of the present disclosure as defined by the claims and their equivalents. It includes various specific details to assist that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

The invention claimed is:

1. An electronic device comprising:
a communication interface configured to receive a screen size of at least one external display device adjacent to the electronic device from the at least one external display device; and
a controller configured to determine a target screen size on the basis of a screen size of the electronic device and the screen size of the at least one external display device and change a display configuration parameter of the electronic device such that the screen size of the electronic device corresponds to the target screen size,
wherein the controller is further configured to:
determine whether the screen size of the electronic device is equal to the screen size of the at least one external display device in order to determine a display mode to set from among a first display mode and a second display mode,
set the first display mode in which the target screen size is determined to be the screen size of the at least one external display device or the screen size of the electronic device, in response to determining that the screen size of the electronic device is not equal to the screen size of the at least one external display device, and
set the second display mode in which the target screen size is determined to be greater than the screen size of the electronic device in response to determining that the screen size of the electronic device is equal to the screen size of the at least one external display device; and
wherein:
in the first display mode, the controller is configured to generate first display data for display on the electronic device and to generate second display data for display on the at least one external display device, and
the second display data is generated for display on the at least one external display data in response to a user input to the electronic device while the first display data is displayed on the electronic device.

2. The electronic device of claim 1, wherein the target screen size is integer times of the screen size of the electronic device in a case where the screen size of the electronic device is equal to the screen size of the at least one external display device.

3. The electronic device of claim 2, wherein the controller is further configured to determine a distribution way on the basis of an arrangement of the electronic device and the at least one external display device.

4. The electronic device of claim 3, wherein the controller is further configured to generate display data corresponding to the target screen size in accordance with the display configuration parameter and separate the display data in accordance with the distribution way.

5. The electronic device of claim 4, wherein the electronic device further comprises a display configured to display a part of the display data corresponding to the electronic device based on the separated display data, and
the communication interface is further configured to transmit the part of the display data corresponding to the at least one external display device among the separated display data to the at least one external display device.

6. The electronic device of claim 1, wherein the target screen size corresponds to the screen size of the at least one external display device in a case where the screen size of the electronic device is not equal to the screen size of the at least one external display device.

7. The electronic device of claim 6, wherein the electronic device further comprises an user interface configured to receive a user input, and
the controller is further configured to generate first display data corresponding to the target screen size through a new process or thread in accordance with the display configuration parameter in response to the user input.

8. The electronic device of claim 7, wherein the controller is further configured to change the display configuration parameter to perform parallel processing for the first display data and second display data, to be displayed through the electronic device.

9. The electronic device of claim 1, wherein the communication interface is further configured to receive information on an event from the at least one external display device, and
the controller is further configured to generate display data corresponding to the target screen size on the basis of the information on the event and the display configuration parameter.

10. A method of sharing a screen with at least one external display device by an electronic device, comprising:
receiving a screen size of the at least one external display device adjacent to the electronic device from the at least one external display device;
determining a target screen size on the basis of a screen size of the electronic device and the screen size of the at least one external display device; and
changing a display configuration parameter of the electronic device such that the screen size of the electronic device corresponds to the target screen size,
wherein the determining of the target screen size comprises:
determining whether the screen size of the electronic device is equal to the screen size of the at least one external display device in order to determine a display mode to set from among a first display mode and a second display mode,
setting the first display mode in which the target screen size is determined to be the screen size of the at least one external display device or the screen size of the electronic device, in response to determining that the screen size of the electronic device is not equal to the screen size of the at least one external display device, and
setting the second display mode in which the target screen size is determined to be greater than the screen size of the electronic device, in response to determining that the screen size of the electronic device is equal to the screen size of the at least one external display device,
and
wherein:
in the first display mode, the controller is configured to generate first display data for display on the electronic device and to generate second display data for display on the at least one external display device, and
the second display data is generated for display on the at least one external display data in response to a user input to the electronic device while the first display data is displayed on the electronic device.

11. The method of claim 10, wherein the target screen size is integer times of the screen size of the electronic device in a case where the screen size of the electronic device is equal to the screen size of the at least one external display device.

12. The method of claim 11, further comprising determining a distribution way on the basis of an arrangement of the electronic device and the at least one external display device.

13. The method of claim 12, further comprising:
generating display data corresponding to the target screen size in accordance with the display configuration parameter; and
separating the display data in accordance with the distribution way.

14. The method of claim 10, wherein the target screen size corresponds to the screen size of the at least one external display device in a case where the screen size of the electronic device is not equal to the screen size of the at least one external display device.

15. The method of claim 14, further comprising:
receiving a user input; and
generating first display data corresponding to the target screen size through a new process or thread in accordance with the display configuration parameter in response to the user input.

16. The method of claim 15, further comprising changing the display configuration parameter to perform parallel processing for the first display data and second display data, to be displayed through the electronic device.

17. The method of claim 10, further comprising:
receiving an information on an event from the at least one external display device; and
generating display data corresponding to the target screen size on the basis of the information on the event and the display configuration parameter.

18. The electronic device of claim 1, wherein the controller is further configured to determine the target screen size to be integer times of the screen size of the electronic device in response to determining that the screen size of the electronic device is equal to the screen size of the at least one external display device.

19. A non-transitory computer readable storage medium comprising instructions which, when executed by at least one processor, causes the at least one processor to perform the method of claim 10.

20. The electronic device of claim 1, wherein the first display mode corresponds to a mode in which content output by the electronic device is resized and the second display mode corresponds to a mode in which the content output by the electronic device is not resized.

* * * * *